United States Patent [19]
Kawai et al.

[11] Patent Number: 5,154,252
[45] Date of Patent: Oct. 13, 1992

[54] POWER TRANSMISSION APPARATUS FOR VEHICLE

[75] Inventors: Satoshi Kawai, Sakurai; Shuzo Hirakushi, Uda; Akihiko Kawano, Kashiwara; Hideki Hagashira, Ikoma, all of Japan

[73] Assignee: Koyo Seiko Co., Ltd., Osaka, Japan

[21] Appl. No.: 686,767

[22] Filed: Apr. 12, 1991

[30] Foreign Application Priority Data

Jun. 5, 1990 [JP] Japan ................................. 2-149650
Jun. 5, 1990 [JP] Japan ................................. 2-149651
Jun. 5, 1990 [JP] Japan ................................. 2-149652
Jan. 23, 1991 [JP] Japan ................................. 3-24033

[51] Int. Cl.⁵ .......................................... B60K 17/344
[52] U.S. Cl. ................................... 180/248; 192/58 R
[58] Field of Search .................... 192/58 R, 58 A; 180/233, 248, 249, 250

[56] References Cited

U.S. PATENT DOCUMENTS

| 4,676,336 | 6/1987 | Hiramatsu et al. | |
| 4,727,966 | 3/1988 | Hiramatsu et al. | |
| 4,850,447 | 7/1989 | Hirakushi et al. | 180/248 |
| 4,862,769 | 9/1989 | Koga et al. | 180/248 |
| 4,919,248 | 4/1990 | Hiramatsu et al. | 180/248 |
| 4,995,491 | 2/1991 | Hiramatsu et al. | 192/58 R |
| 5,071,396 | 12/1991 | Kobayashi | 180/248 |
| 5,098,351 | 3/1992 | Kobayashi | 180/248 |

FOREIGN PATENT DOCUMENTS

| 212721 | 3/1987 | European Pat. Off. | 180/248 |
| 0365824 | 5/1990 | European Pat. Off. | |
| 2549927 | 5/1976 | Fed. Rep. of Germany | |
| 60-116526 | 6/1985 | Japan | |
| 61-249827 | 11/1986 | Japan | |
| 61-249828 | 11/1986 | Japan | |
| 2163107 | 2/1986 | United Kingdom | 180/248 |
| 2234022 | 1/1991 | United Kingdom | 180/248 |

Primary Examiner—Robert P. Olszewski
Assistant Examiner—Steven M. Reiss
Attorney, Agent, or Firm—Darby & Darby

[57] ABSTRACT

A power transmission apparatus for vehicles for transmitting a driving force by coupling an input shaft and an output shaft of a hydraulic pump to respective driving shafts of front and rear wheels of a four-wheel drive vehicle, wherein a throttle member which is located on the axis of a rotor and a casing interlocking respectively with the input and output shafts, rotated with interlocking with one of the rotor and casing and disposed movably along the axis to change the hydraulic fluid discharge passage area of the hydraulic pump responsive to its movement, and a driving unit which includes a magnetic member coupled coaxially to the throttle member and a coil installed around the magnetic member and supported nonrotatably, and moves the throttle member by movement of the magnetic member in connection with excitation of the coil are provided.

17 Claims, 14 Drawing Sheets

POWER TRANSMISSION APPARATUS FOR VEHICLE

BACKGROUND OF THE INVENTION

1. Field of the Invention

The present invention relates to a power transmission apparatus for vehicles which transmits a driving force from one transmission shaft to the other transmission shaft by hydraulic pressure generated in a hydraulic pump, more particularly, it relates to a power transmission apparatus for vehicles which, in a four-wheel drive vehicle, transmits the driving force from the transmission shaft on the front wheel side to that on the rear wheel side or vice versa to realize a four-wheel driving state.

2. Description of the Related Art

In recent years, a four-wheel drive vehicle is particularly highlighted as the vehicle which can realize a comfortable driving regardless of the road conditions, natural conditions such as weather and driving conditions, because of its high running stability in specific surface conditions such as the snow and gravel roads and its superb driving stability during the high speed driving and at acceleration and deceleration also on the ordinary roads.

Furthermore, recently, a so-called full-time four-wheel drive vehicle constructed always to obtain substantially the four-wheel driving state by having a power transmission apparatus, which changes power distributions to the front and rear wheels responsive to the rotational speed difference generated therebetween when it took place, is the mainstream.

As such a four-wheel drive vehicle, it is the general trend to provide the power transmission apparatus which distributes the driving force responsive to the rotational speed difference generated between the front and rear wheels, in the midway of a transmission shaft between the front and rear wheels. As such a power transmission apparatus, there is the one which utilizes hydraulic pressure generated in a hydraulic pump, particularly, a vane pump which can be easily made to be small sized and lightweighted and having durability.

The vane pump, as already known, is provided with a casing constituted by a cam ring formed annually with deviation in thickness and side plates mounted on its sides, and a short cylindrical rotor, onto which a plurality of plate vanes are disposed substantially in equal intervals in a circumferential direction, mounted movable in a radial direction, and is constructed to form a pump chamber surrounded by the outer surface of the rotor, the inner surface of the cam ring, and further, by these and side walls of the side plates, by containing the rotor rotatably coaxially in an inner space of the casing. By sealing working oil introduced into the pump chamber between the vanes adjoining each other, pressure is raised responsive to the rotation of the rotor.

The power transmission apparatus is so designed that, by securing the rotor coaxially to the driving shaft connected to either of the front and rear wheels, and securing the casing coaxially to the driving shaft connected to the other wheels, relative rotation corresponding to the rotational speed difference between the front and rear wheels is generated between the rotor and the casing. At this time, since the hydraulic pressure generated in the vane pump chamber corresponding to the relative rotation or the rotational speed difference between the front and rear wheels, acts to restrain the relative rotation between the rotor and the casing, the driving force responsive to the rotational speed difference between the front and rear wheels is transmitted from one of the front and rear wheels to the other via the hydraulic pressure, thereby a desired four-wheel driving state is realized.

Now, in the four-wheel drive vehicle, for example, in case of driving on bad roads such as the snow and gravel roads, it is desirable to obtain a rigid coupling state as much as possible to secure the stable running. Meanwhile, in case of driving on the paved road, it is desirable to obtain a relatively loose coupling state to change transfer characteristics of the driving force between the front and rear wheels so as to prevent a tight corner braking phenomenon reliably.

Besides, it is also desirable to change the transfer characteristics not only responsive to the road conditions aforementioned, but also to various running states such as the vehicle speed, steering angle and braking.

Moreover, in the power transmission apparatus using a hydraulic pump, the power transmission between the front and rear wheels is effected via the hydraulic pressure generated in the hydraulic pump, thus the magnitude of the transmission force corresponds to the hydraulic pressure. However, as the power transmission apparatus (casing of the vane pump) rotates by itself, working oil in the hydraulic pump is sealed inside an oil tank which is formed as surrounding around the casing and restricted in size, and recirculated for use. Therefore, the temperature rise of the working oil during operation is unavoidable, results in pressure drop in the hydraulic pump due to the lowering of viscosity in connection with the temperature rise, whereby the transfer characteristics of the driving force between the front and rear wheels may change to cause insufficient transmission of the driving force corresponding to the rotational speed difference between the front and rear wheels.

In view of such circumstances, the inventors have proposed, in the U.S. Pat. No. 4,850,447, a power transmission apparatus, in which changes in transfer characteristics of the driving force corresponding to the running state, and corrections of transfer characteristics change in connection with the change in oil temperature are made possible.

Frankly speaking, the invention is constituted such that, by providing a variable throttle driven electrically or hydraulically in a n oil discharge passage of the hydraulic pump, and changing an opening of the variable throttle to change passage resistance in the oil discharge passage, the pressure characteristics of the hydraulic pump can be changed. On the other hand, sensors for detecting various state quantities relating to the running states such as the vehicle speed, steering angle and accelerator opening are arranged on the vehicle body. In this power transmission apparatus, an appropriate transfer characteristics responsive to the running states is obtained by adjusting the energizing current to the solenoid, and changing the throttle opening of the variable throttle continuously in response to the detect on results of respective sensors.

In such power transmission apparatus for vehicles, the transfer characteristics change in connection with the oil temperature rise may be corrected by changing the throttle opening responsive also to the detection result of working oil temperature, thereby desired transfer characteristics can always be obtained.

In the variable throttle adopted in the aforesaid U.S. Pat. No. 4,850,477, however, in case of electrical drive, wirings to a drive source are required, and in case of hydraulic drive, hydraulic pipings to the drive source are required respectively. However, since it is difficult to fix the wirings or pipings to the power transmission apparatus which is rotating as aforementioned, they are fixed to the stationary portion in the vicinity of the apparatus. Accordingly, the oil discharge passage of the hydraulic pump aforementioned is inevitably so constructed in a complicate way that, it extends from the rotating power transmission apparatus to the variable throttle provided on the stationary portions, and from which it returns further to the power transmission apparatus.

Therefore, in the U.S. Pat. No. 4,850,447, oil discharged from the hydraulic pump is temporarily once introduced into the power transmission apparatus from the oil passage formed in the axis of the rotary shaft of the rotor, led to the stationary portion in the vicinity of the supporting position of the rotary shaft outside the power transmission apparatus, and after passing through the variable throttle fixed thereon, guided into the oil passage formed at a portion of the casing near the supporting position thereof, and returned to the oil tank.

In the conventional power transmission apparatus in which the transfer characteristics of the driving force can be changed, oil discharge passages having a complicated construction is necessary, accordingly, on manufacturing the apparatus, not only a great deal of works are required for forming the oil passages, but also a troublesome work of matching the oil passages here and there one another is encountered at assembling.

Also, in addition to a complicated construction of the driving solenoid for changing the opening of the variable throttle continuously, a control unit for controlling the energizing current to the solenoid becomes complicated, results not only in a high cost but also a high provability of defective operation of the solenoid and control unit as well as a low reliability are feared.

Furthermore, in order to meet the requirements stated above, a variable throttle whose opening is adjustable from the outside must be provided in the middle of the oil discharge passage formed in the rotating casing, results in a difficult arrangement.

That is, generally, it may be considered to construct in such a manner that, a portion connecting the casing of the vane pump and a transmission shaft corresponding thereto is made cylindrically so as to incorporate a variable throttle and a magnetic member connected to one side of the variable throttle slidably in an axial direction on the axis thereof, and at the same time, an exciting coil fixed to any position is provided around the cylindrical portion to move the magnetic member, thereby adjusting the opening of the variable throttle.

However, in the case where such a configuration is adopted, in order to focus the magnetic flux generated by energizing the exciting coil on the position where the magnetic member is disposed to move the magnetic member reliably, it is important to cut off the magnetic flux leakage into the cylindrical portion. In order to obtain this end, a ring made of non-magnetic member is welded on the middle of the cylindrical portion to cut off the magnetic flux leakage of the magnetic member, thereby the magnetic flux is focused on the magnetic member. However, in the case where the magnetic member and the non-magnetic member are welded therebetween, a sufficient welding strength can not be guaranteed, so that when a large transmission torque is exerted on the cylindrical portion, the welded portion may break.

Against the fact that the exciting coil which is fixed to any portion of the vehicle body, the cylindrical portion containing the magnetic member is rotated together with the power transmission apparatus, therefore, variations of the relative position in a radial direction of the magnetic member against the exciting coil due to vibration of the vehicle body during running can not be avoided. Therefore, there is the possibility that the intensity of magnetic field in the position where the magnetic member is disposed becomes unstable to cause fluctuations of the opening of the variable throttle, thereby the desired transfer characteristics can not be obtained and further, in the case where vibration of the vehicle body is large, the exciting coil may be damaged by collision with the cylindrical portion.

Moreover, there are some difficulties in that, the driving solenoid of the variable throttle becomes complicated in construction, and in order to obtain the appropriate throttle opening for respective detection results of plural kinds of state quantities and to realize the opening, an opening control unit for adjusting the energizing current to the solenoid continuously becomes complicated in construction, thus in addition to the high manufacturing cost, results in a high probability of defective operation of the solenoid and opening control unit and a low reliability.

SUMMARY OF THE INVENTION

The present invention has been devised in view of such circumstances, therefore, it is a first object thereof to provide a power transmission apparatus for vehicles in which transfer characteristics of a driving force can be changed by a simple hydraulic fluid discharge passage configuration.

It is also a second object of the present invention to provide a power transmission apparatus for vehicles in which, by cutting off the magnetic flux leakage into a holding member of a variable throttle without causing insufficient strength of the holding member, and preventing reliably any variations of relative position between a magnetic member constituted in a unit with the throttle member and an exciting coil, the transfer characteristics can be changed reliably without changing the opening of the variable throttle.

It is further a third object of the present invention to provide a power transmission apparatus for vehicles, in which selection of plural different transfer characteristics is realized by a simple configuration of a solenoid for driving the throttle member and an energizing current control unit for the solenoid, to improve the reliability and to reduce the cost.

It is a fourth object of the present invention to provide a power transmission apparatus for vehicles, in which transfer characteristics responsive to the running states of the vehicle can be changed by a simple configuration to improve the reliability and to reduce the product cost.

A first invention of a power transmission apparatus for vehicles according to the present invention, in which a hydraulic pump having a rotor and a casing which are respectively coupled and interlocked with respective transmission shifts of front and rear wheels, and rotated relatively on the same axis is constituted, and the front and rear wheels are connected by hydraulic pressure generated in the hydraulic pump responsive to the rotational speed difference between the front and rear wheels, a throttle member which is positioned on the axis of the rotor and casing, rotated with interlocking with either the rotor or casing and disposed movably along the axis to change the hydraulic fluid discharge passage area of the hydraulic pump responsive to the movement thereof, and a driving unit having a magnetic member coupled coaxially to the throttle member and a coil provided around the magnetic member and supported nonrotatably to drive the throttle member by movement of the magnetic member caused by excitation of the coil are provide.

In the first invention, the throttle member rotated in connection with the rotation of the rotor and casing, is moved together with the magnetic member which is disposed coaxially and coupled thereto, by the action of magnetic field generated by the coil surrounding the magnetic member and supported nonrotatably, to change the hydraulic fluid discharge passage area of the hydraulic pump, thereby the transfer characteristics of the driving force is changed.

A second invention of a power transmission apparatus for vehicles according to the present invention, in which a hydraulic pump having a rotor and a casing which are respectively coupled and interlocked with respective transmission shafts to the front and rear wheels, and rotated relatively on the axis is constituted, and a throttle member to which a magnetic member is coupled is provided in the middle of the hydraulic fluid discharge passage of the hydraulic pump, to change the transfer characteristics to the transmission shafts via the hydraulic pressure generated in the hydraulic pump by movement of the throttle member generated responsive to the energizing current to the exciting coil, between a pair of coupling flanges, a holding cylinder made of a non-magnetic material which is interposed coaxially between the rotor or casing and the transmission shaft respectively corresponding thereto together with the flanges, and holds the throttle member therein slidably on the center, and a supporting cylinder which is held nonrotatably and supports the holding cylinder therein rotatably coaxially are provided. The magnetic member is connected to the throttle member in a unit, and the exciting coil is fixed to the inside of the supporting cylinder via the peripheral wall of the holding cylinder so as to surround the magnetic member.

In the second invention, the throttle member and magnetic member connected thereto are held slidably in the holding cylinder made of non-magnetic member, the holding cylinder is supported rotatably coaxially in the supporting cylinder in which the exciting coil is fixed, these above being interposed coaxially between the transmission shafts corresponding respectively to the rotor or casing to constrain the rotation of the supporting cylinder by engagement with any fixed portion. Thereby, the holding cylinder and the magnetic member fixed thereto do not produce relative positional variations against the supporting cylinder and the exciting coil fixed thereto. Strength against the transmission torque exerted on the holding cylinder is guaranteed by the holding cylinder.

Third and fourth inventions of a power transmission apparatus for vehicles according to the present invention, in which a hydraulic pump having a rotor and a casing which are respectively coupled and interlocked with respective transmission shafts to the front and rear wheels, and rotated relatively on the same axis is constituted, and transfer characteristics to the front and rear wheels via hydraulic pressure is changed, by disposing a throttle member driven by an exciting coil on the discharge side of the hydraulic pump, and by moving the throttle member against the biasing force of a biasing member by energizing the exciting coil to control the hydraulic fluid flow resistance on the discharge side, the biasing member is constituted by a plurality of springs arranged in parallel or in series, and the exciting coil is constituted by disposing a plurality of coils which can be energized in parallel.

In the third and fourth inventions, plural different transfer characteristics are realized by changing the energizing current to the exciting coil stepwisely to move the throttle member urged by a plurality of springs disposed in parallel or in series in plural steps against the biasing force of respective springs, or by applying a predetermined current separately to a plurality of coils of the exciting coil to move the throttle member stepwisely by the action of magnetic fields of different intensity generated during energizing respectively.

A fifth invention of a power transmission apparatus for vehicles according to the present invention, in which a hydraulic pump having a rotor and a casing which are respectively coupled and interlocked with respective transmission shafts to the front and rear wheels, and rotated relatively on the same axis is constituted, a variable throttle is disposed on the discharge side of the hydraulic pump, and the transfer characteristics to the front and rear wheels via hydraulic pressure is changed by controlling the throttle opening, detecting means for detecting a plural state quantities relating to the running states of a vehicle, and an opening control unit which controls the variable throttle in response to combination of respective detection results to change the throttle opening stepwisely.

In the fifth invention, not the very results of the state quantity associated with the vehicle running states detected by the detecting means, but in response to whether or not these combinations would satisfy a predetermined condition, the variable throttle is controlled to either of the throttle openings of plural steps to realize the plural transfer characteristics corresponding to the respective throttle openings.

The above and further objects and features of the invention will more fully be apparent from the following detailed description with accompanying drawings.

DESCRIPTION OF THE PREFERRED EMBODIMENTS

In the following, the present invention will be described with reference to the drawings showing its preferred embodiments.

Figure 1:
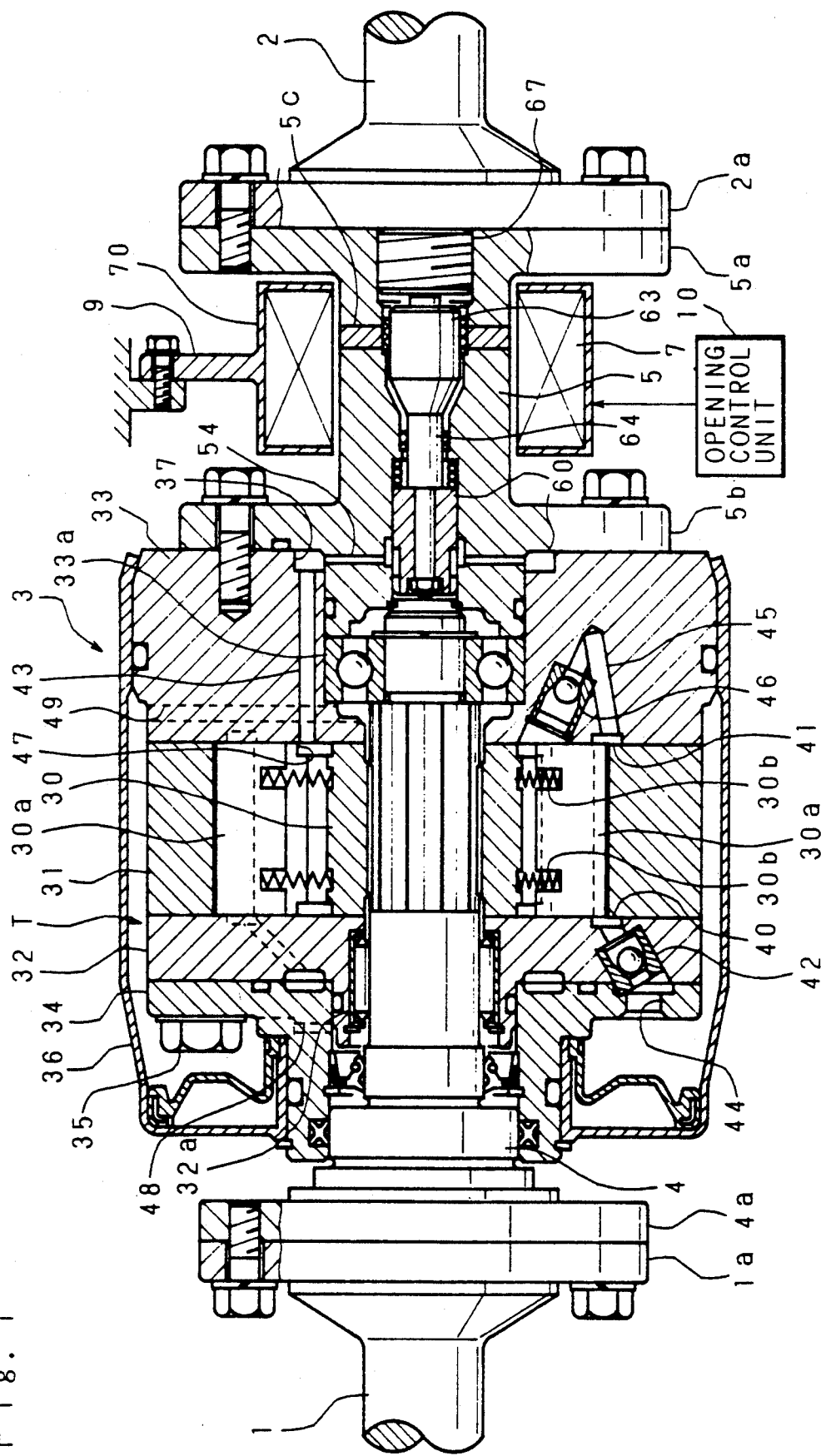
FIG. 1 is a longitudinal sectional view showing an example of configuration of one embodiment of a first invention of the present invention.

FIG. 1 is a longitudinal sectional view showing an example of configuration of an embodiment of a first invention of a power transmission apparatus for vehicles (hereinafter referred to as an apparatus of the invention) according to the present invention.

In FIG. 1, numeral 1 designates an input shaft which rotates with interlocking with either of front and rear wheels which receives transmission of a driving force directly from a engine as a power source, and numeral 2 designates an output shaft which rotates with interlocking with the other front or rear wheels.

In the apparatus of the invention, by pressure generated in a vane pump 3 interposed between the input shaft 1 and the output shaft 2, the driving force is transmitted from the input shaft 1 to the output shaft 2, or from either of the front and rear wheels to the other wheels, responsive to the rotational speed difference between the shafts, or the rotational speed difference generated between the front and rear wheels.

Main component elements of the vane pump 3 comprises mainly a short cylindrical rotor 30, and a casing constituted by a cam ring 31 containing the rotor 30 coaxially, a side plate 32 and a pressure plate 33 secured to both sides of the cam ring 31 in a manner to be described later.

The rotor 30 has a plurality of strip-like receiving grooves formed substantially in equal intervals in its circumferential direction. Into the respective receiving grooves, thin rectangular plate vanes 30a are inserted slidably in the radial direction of the rotor 30.

The cam ring 31 is a member formed cylindrically with deviation in thickness and having a substantially same axial length as the rotor 30, and in the center thereof, a cavity having a slightly larger diameter than the outside diameter of the rotor 30 and is provided with a plurality of depressions arranged in equal intervals in a circumferential direction is formed.

The side plate 32 is a relatively thin annular disc-shaped member and the pressure plate 33 is a relatively thick annular disc-shaped member, respectively having a supporting hole of a rotor shaft 4 to be described later at their center positions. The side plate 32 and the pressure plate 33 are mounted to the cam ring 31 as clamping the cam ring 31 therebetween. In the side plate 32, to one side of an annular disc positioned coaxially, a short cylinder is connected.

On the input shaft 1 side of the side plate 32, a shaft sealing member 34 positioned coaxially with the side plate 32, pressure plate 33 and rotor 30 is disposed. The disc portion of the shaft sealing member 34, side plate 32 and cam ring 31 are joined together with the shaft sealing member 34 in a unit, by a plurality of fixing bolts 35 extending axially therethrough in this order on the other side of the side plate 32, and threaded into respective screw holes, not shown, formed in the pressure plate 33, to constitute a casing of the vane pump 3. Outside the casing, a thin cylindrically formed cover member 36 engaged partly to the periphery of the pressure plate 33 and to that of the cylindrical portion of the shaft sealing member 34 is mounted. Working oil of the vane pump 3 is sealed inside an oil tank T formed annularly between the cover member 36 and the casing.

In the figure, numeral 5 designates a coupling member which serves as a spacer and is constituted by a cylindrical portion having a cavity of the shape to be described later in the center position thereof, and disc-shaped coupling flanges 5a, 5b formed coaxially with the cylindrical portion on both sides thereof. The coupling member 5 is interposed between the casing of the vane pump 3 and the output shaft 2, one coupling flange 5a being secured to a coupling flange 2a formed at the end of the output shaft 2, and the other coupling flange 5b being secured to the other side face of the pressure plate 33, thereby coupling the casing and the output shaft 2 on the same shaft.

Meanwhile, the rotor 30 is inserted in a space surrounded by the cavity of the cam ring 30, the side plate 32 and the pressure plate 33. The rotor 30 is provided on the rotor shaft 4 between the supports by spline engagement.

The rotor shaft 4 is born by a needle roller bearing 32a and a ball bearing 33a respectively fixed inside the core portion of the side plate 32 and the pressure plate 33. The rotor shaft 4 is sealed at its periphery by an oil seal and an X-ring mounted on the inner wall of the cylindrical portion of the shaft sealing member 34, and projecting on the side of the side plate 32 by suitable length. At the projecting end of the rotor shaft 4, a coupling flange 4a formed coaxially with the rotor shaft 4 is secured to a disc flange 1a formed at the end of the input shaft 1, thereby coupling the rotor shaft 4 and the input shaft 1 coaxially.

That is, the casing of the vane pump 3 is coupled to the output shaft 2 via the coupling member 5, and is rotated about its axis in interlocking motion with the rotation of the output shaft 2. Meanwhile, since the rotor 30 is coupled to the input shaft 1 via the rotor shaft 4 and is rotated about its axis in interlocking motion with the rotation of the input shaft 1, between the rotor 30 and the casing, the relative rotation corresponding to the rotational speed difference between the input shaft 1 and the output shaft 2, or between the front and rear wheels is generated.

In this way, between the outer surface of the rotor 30 and the inner wall of the cavity of the cam ring 31 inserted inside the casing, a space (pump chamber) surrounded by the two surfaces and side walls of the side plate 32 and that of pressure plate 33 is formed at the position where depressions of the cam ring 31 is formed. In respective pump chambers, positioning at opposite ends in the rotating direction of the rotor 30, each pair of suction ports 40 opening on the side plate 32 side and each pair of discharge ports 41 opening on the pressure plate 33 side are formed.

Each of the suction ports 40 is communicated with the oil tank T through separate suction check valves 42 which are fixed to the disc portion of the side plate 32 responsive to the position of the suction ports 40 and allow only inflow of the working oil into the pump chamber, and through separate suction oil passages 44 extending through the shaft sealing member 34 in a direction of its thickness.

On the other hand, each of the discharge ports 41 communicated with the oil tank T through separate suction check valves 42 which are fixed to the disc portion of the side plate 32 responsive to the position of the suction ports 40 and allow only inflow of the working oil into the pump chamber, and through separate suction oil passages 44 extending through the shaft sealing member 34 in a direction of its thickness.

On the other hand, each of the discharge ports 41 is communicated with an annular groove 47 formed on the side wall of the rotor 30 so as to communicate bottoms of the receiving grooves of respective vanes 30a one another, through oil discharge passages 45 formed in a manner to bend inward radially in the pressure plate 33, and through separate discharge check valves 46 which are secured at the middle of the oil discharge passage 45 and allow only outflow of the working oil from the pump chamber.

In the pressure plate 33, there is formed an oil guide hole 43 extended therethrough in the axial direction. The oil guide hole 43 is opened in the annular groove 47 at one end, and is opened in the annular groove 37 provided along the inner wall of the supporting hole at the position on the surface a little close to the outside surface of the pressure plate 33 at the other end.

Meanwhile, an annular space between the supporting hole of the side plate 32 and the rotor shaft 4 is communicated with the oil tank T by a flow back hole 48 extending through the cylindrical portion of the shaft sealing member 34, and an annular space between the supporting hole of the pressure plate 33 and the rotor shaft 4 by a flow back hole 49 extending through the pressure plate 33 radially, the annular spaces being kept substantially in the isobaric state with the oil tank T.

Figure 2:
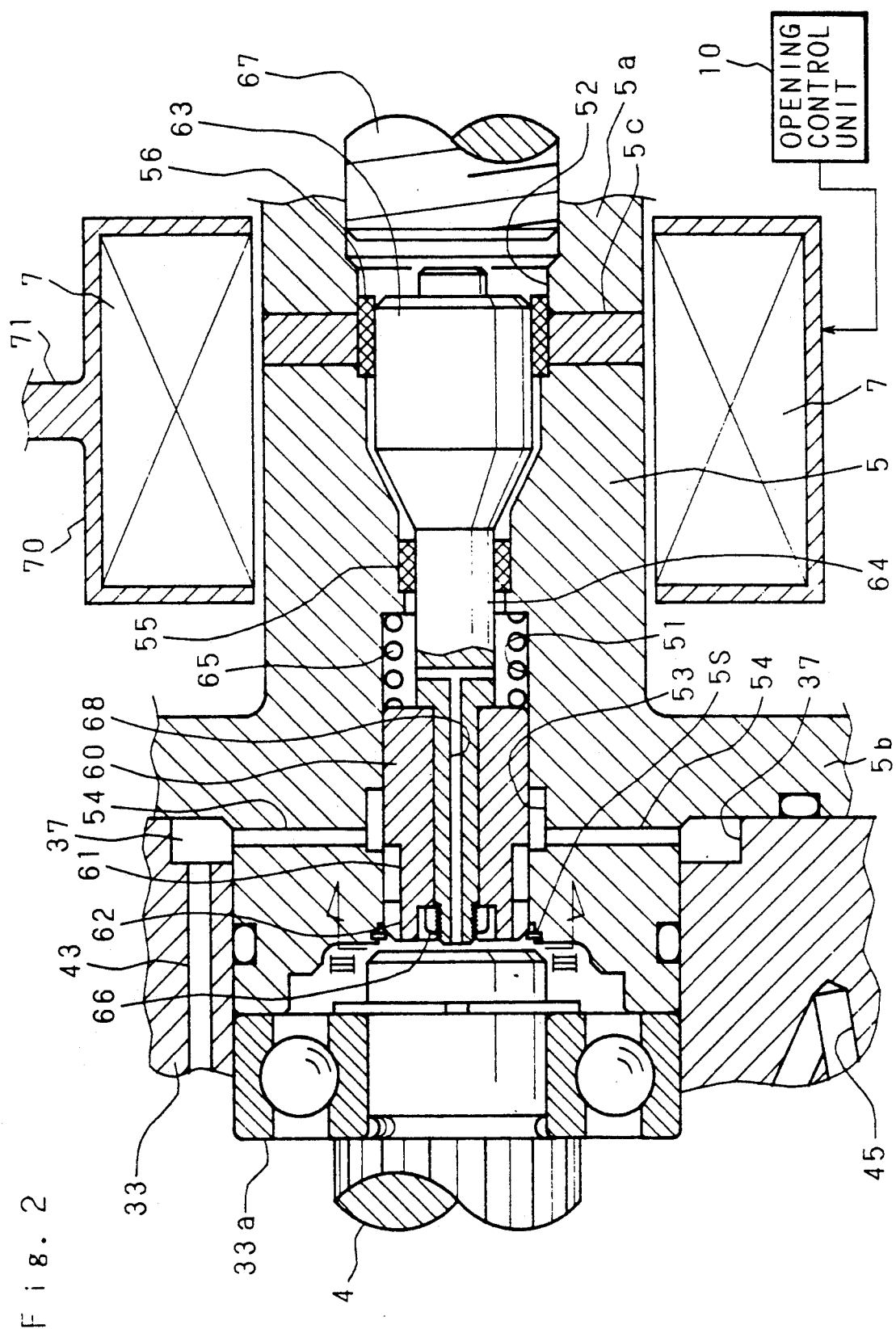
FIG. 2 is an enlarged sectional view showing a configuration of a characteristic portion and its peripheral portion shown in FIG. 1.

FIG. 2 is a partially enlarged sectional view of a coupling member 5 interposed between a casing of a vane pump 3 and an output shaft 2 shown in FIG. 1 and its periphery.

The coupling member 5 is inserted partly into the supporting hole of the pressure plate 33 on the coupling flange 5b side (left-hand side in the figure), and is contacted to the outer surface of the ball bearing 33a at its end face to function also as a pressing member of the ball bearing 33a.

In the center of the coupling member 5, throughout the entire length thereof in the axial direction, a round sectional cavity consisting of a large diameter portion 51 formed on the coupling flange 5b side or on the side secured to the pressure plate 33, a large diameter portion 52 formed on the coupling flange 5a side or on the side secured to the output shaft 2, and a reduced diameter portion formed so as to connect the large diameter portions is formed. Around the inner wall of the large diameter portion 51, a second annular groove 53 having rectangular section is formed in the vicinity of the opening end thereof. The second annular groove 53 is communicated with the annular groove 37 formed around the supporting hole of the pressure plate 33, by a communicating oil passage 54 which opens in the second annular groove 53 at one end, and extends radially through the engaging portion with the pressure plate 33.

Inside the large diameter portion 51, a cylindrical throttle member 60 is inserted slidably in the axial direction. On the throttle member 60, an annular groove 61 having rectangular section and communicated with the second annular groove 53 around the inner wall of the large diameter portion 51, is formed on the outer surface near one side end on the pressure plate 33 side.

Figure 3:
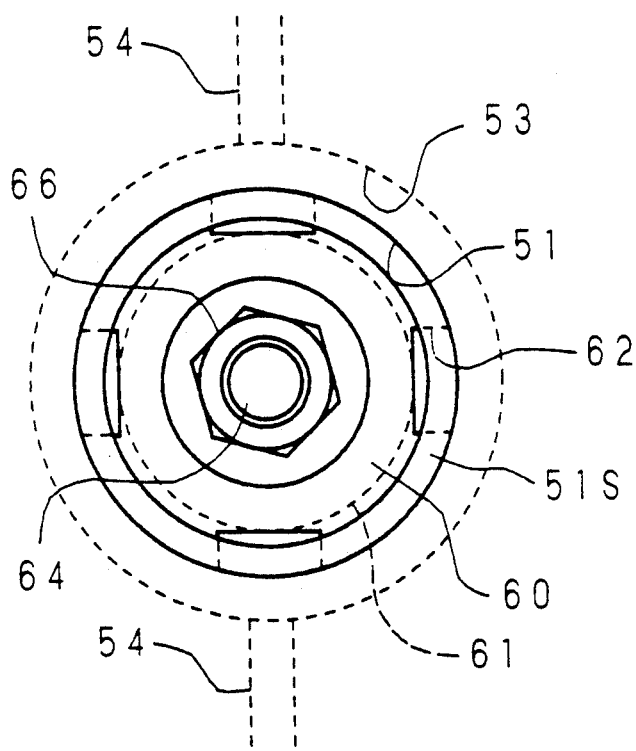
FIG. 3 is an enlarged view taken along the line III—III of FIG. 2.

FIG. 3 is an enlarged view taken along the line III—III of FIG. 2.

As shown in FIG. 3, the annular groove 61 is communicated with one side of the throttle member 60, or an annular space in the supporting hole of the pressure plate 33, by first annular grooves 62 formed by notching plural locations rectangularly (4 locations in the embodiment shown in FIG. 3) in the circumferential direction.

Accordingly, respective discharge ports 41 of the vane pump 3 are communicated with the annular space which is kept at low pressure in the supporting hole of the pressure plate 33, from the oil discharge passage 45, discharge check valve 46, annular groove 47 and oil guide hole 43 through the annular groove 37, communicating oil passage 54, second annular groove 53, annular groove 61 and first annular grooves 62. Areas of the oil passage change responsive to variations of the communicating area between the second annular groove 53 and the annular groove 61, generated by sliding motion of the throttle member 60 along the large diameter portion 51 of the coupling member 5.

In FIG. 1, the throttle member 60 is at the position spaced from the pressure plate 33, and the large communicating area is shown. In FIG. 2, the throttle member 60 is at the position close to the pressure plate 33, and the small communicating area is shown.

Meanwhile, into the large diameter portion 52 of the coupling flange 5a side, a magnetic member, specifically, an iron core 63 is inserted. The iron core 63 is formed into a short circular cylinder being provided with a tapered reduced diameter portion on one side, or the throttle member 60 side, so as to be easily affected by the action of magnetic filed generated by the driving coil 7 to be described later. To the end portion on the reduced diameter side fo the iron core 63, a round bar-shaped coupling rod 64 extending to the large diameter portion 51 on the other side through the reduced diameter portion of the coupling member 5 is connected coaxially. The iron core 63 is born slidably along the axis of the cavity portion by slide bushes 55 and 56 respectively pressed in and fixed onto the inner walls of the reduced diameter portion and the large diameter portion 52.

The coupling rod 64 is, in the large diameter portion 51, inserted through the center of the throttle member 60 and fixed thereto in a unit by means of a fixing nut 66 screwed onto the tip thereof. As shown in FIG. 1 and FIG. 2, the throttle member 60 is urged left-ward in the figures, specifically, in the direction toward the pressure plate 33, by a coil spring 65 as a biasing member disposed on the shoulder portion between the large diameter portion 51 and the reduced diameter portion of the coupling member 5.

Accordingly, the throttle member 60 and the iron core 63 are coupled coaxially by the coupling rod 64, and responsive to the action of the external force against the biasing force of the coil spring 65, moves along the axis of the coupling member 5 or the axis of the casing and rotor 30 of the vane pump 3.

In the proximity around the cylindrical portion of the coupling member 5 incorporating the throttle member 60 and the iron core 63 etc. coupled thereto as aforementioned, a driving coil 7 is installed.

As shown in FIG. 1, the driving coil 7 is supported nonrotatably by a support leg 9 which is projected from a portion of a housing 70 and fixed to a portion of the vehicle body adjacent to the vane pump 3. In the case where the driving coil 7 is energized, a force directed against the biasing force of the coil spring 65 is applied to the iron core 63, by the action of magnetic filed generated along the axis of the coupling member 5.

Therefore, in the case where the driving coil 7 is deenergized, since only the biasing force of the coil spring 65 is applied to the throttle member 60, which is at the position shown in FIG. 2, thus the communicating area between the annular groove 61 and the second annular groove 53 is small. On the other hand, in the case where the driving coil 7 is energized, since a magnetic force corresponding to the energizing current to the driving coil 7 is applied to the iron core 63 in opposite direction to the biasing force of the coil spring 65, the throttle member 60 coupled to the iron core 63 is moved to the position where the magnetic force and the biasing force of the coil spring 65 are balanced, thus the communicating area between the annular groove 61 and the second annular groove 53 is increased.

The increasing amount of communicating area between the annular groove 61 and the second annular groove 53 corresponds to the moving amount of throttle member 60, which in turn corresponds to the energizing current to the driving coil 7. Accordingly, the communicating area between the annular groove 61 and the second annular groove 53, namely, the area of oil passage which is communicated from the discharge port 41 of the vane pump 3 to the supporting hole of the pressure plate 33, through the oil discharge passage 45, discharge check valve 46, oil guide hole 43, annular groove 37, communicating oil passage 54, second annular groove 53, annular groove 61 and first annular groove 62 can be changed.

A range of movement of the throttle member 60 at the right side in FIG. 1 and FIG. 2 is restricted by a tap member 67 screwed into the opening end of the large diameter portion 52 of the coupling member 5, and at the left side in FIG. 1 and FIG. 2 is restricted by a snap ring 5S put in inner surface of the large diameter portion 51 at end portion of the pressure plate 33. Therefore, as shown in FIG. 1 and FIG. 2, the throttle member 60 is movable between the position where the end portion of the iron core 63 contacts to the tap member 67 and the position where the end portion at the first annular groove 62 side of the throttle member 60 contacts to the snap ring 5S.

For the purpose of focusing the magnetic flux generated by energizing the driving coil 7 on the center position of the coupling member 5 to secure movement of the iron core 63, a ring 5c made of non-magnetic member is provided in the middle of the cylindrical portion of the coupling member 5.

The driving coil 7 is energized by the energizing instruction given from an opening control unit 10, in response to the detection results of running states such as the steering and speed of a vehicle onto which the apparatus of the present invention is mounted.

In the first invention of the apparatus of the present invention thus constructed, in the case where here is no rotational speed difference between the input shaft 1 and the output shaft 2, the relative rotation is not generated between the rotor 30 rotated with interlocking with the former, and the cam ring 31 rotated with interlocking with the latter. Therefore, oil inside the pump chamber only rotates in connection with the rotation of the rotor 30 and the cam ring 31 and hydraulic pressure is not generated, thus the driving force is not transmitted to the output shaft 2 from the input shaft 1.

Such a state corresponds to a state wherein the four-wheel drive vehicle is running straight ideally at constant speed, in the case where one of the front and rear wheels of the four-wheel drive vehicle is connected to the input shaft 1 of the apparatus of the present invention and the other to the output shaft 2 thereof. However, such state occurs very seldom at actual running, and in reality, a certain degree of rotational speed difference is always generated between the front and rear wheels, or between the input shaft 1 and the output shaft 2. Particularly, in the case where either the front wheels or the rear wheels are idling, or in the case where a large load is applied to either of the front or rear wheels such as acceleration and deceleration, a large rotational speed difference is generated therebetween.

In the case where the rotational speed difference is generated between the front and rear wheels of the four-wheel drive vehicle, the relative rotation corresponding to the rotational speed difference between the front and rear wheels is generated between the rotor 30 and the cam ring 31, and the working oil inside the oil tank T is introduced into the pump chamber from the suction port 40 open at the upstream side in the direction of relative rotation, through the suction oil passage 44 and the suction check valve 42. Vanes 30a of the rotor 30 are rotated in connection with the rotation of the rotor 30, while being pressed against the inner wall of the cavity of the cam ring 31 at their edges, by the biasing force of each pair of coil springs 30b provided between the bottoms of respective receiving grooves, and the action of pressure oil guided into the bottoms of respective receiving grooves as to be described later. Thereby, as stated before, oil introduced into respective pump chambers is sealed between two vanes 30a adjoining one another, rotated in connection with the rotation of the rotor 30 and pressurized, producing hydraulic pressure inside each of the pump chambers. The hydraulic pressure functions to restrain the relative rotation aforementioned between the rotor 30 and the cam ring 31, so that the driving force is transmitted from the input shaft 1 to the output shaft 2, or from one of the front and rear wheels to the other, thereby the four-wheel driving state is realized smoothly.

Now, the working oil pressurized inside each of the pump chambers is discharged from the discharge port 41 open on the down stream side in the direction of relative rotation, and introduced into the bottoms of the vanes 30a, through the oil discharge passage 45, discharge check valve 46 and annular groove 47, and functions to urge respective vanes 30a outwardly. Thereafter, the working oil is introduced into the second annular groove 53 around the inner wall of the large diameter portion 51 of the coupling member 5, through the oil guide hole 43, annular groove 37 and communicating oil passage 54, then after passing through the communicating portion between the second annular groove 53 and the annular groove 61 around the throttle member 60, guided into the supporting hole of the pressure plate 33 via the first annular grooves 62.

At this time, though pressure oil introduced into the second annular groove 53 leaks partly into a space wherein the coil spring 65 is installed, through a narrow gap between the periphery of the throttle member 60 and the inner wall of the large diameter portion 51, the leaked oil is guided into the supporting hole of the pressure plate 33 through an circulating oil passage 68 formed in the center of the coupling rod 64. The working oil functioned to urge the vanes 30 radially outward leaks into the supporting holes of the side plate 32 and the pressure plate 33, through a narrow gap between both side faces of the rotor 30 and side faces of the side plate 32 and the pressure plate 33. The working oil thus introduced into the supporting holes of the side plate 32 and the pressure plate 33 is, after lubricating the needle roller bearing 32a and the ball bearing 33a, returned to the oil tank T through the return holes 48, 49 and again sucked into the vane pump 3 for circulation.

As stated heretofore, hydraulic pressure inside respective pump chambers of the vane pump 3 is generated against the flow resistance in the oil passage from the oil guide hole 43 to the supporting hole of the pressure plate 33 through the communicating portion of the second annular groove 53 and the annular groove 61, and the driving force corresponding to the hydraulic pressure is transmitted between the input shaft 1 and the output shaft 2, or between the front and rear wheels of the four-wheel drive vehicle.

In the apparatus of the present invention, however, as previously stated, it is so constructed that the throttle member 60 is moved responsive to the excitation of the driving coil 7 and the communicating area between the second annular groove 53 and the annular groove 61 is changed responsive to the movement of the throttle member 60, so that when the aforesaid flow resistance is changed by changing the energizing current quantity to the driving coil 7, generating pressure characteristics of the vane pump 3, in other words transfer characteristics of the driving force between the front and rear wheels can be changed.

Figure 4:
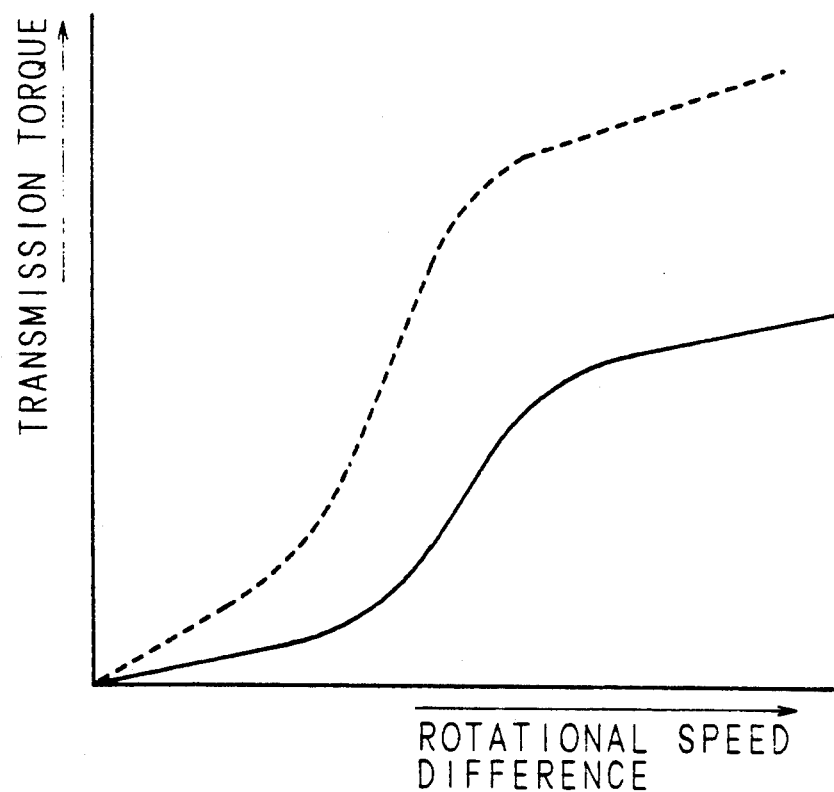
FIG. 4 is a graph showing transfer characteristics of a driving force between input/output shafts realized by an apparatus of the present invention.

FIG. 4 is a graph showing an example of transfer characteristics of the driving force realized by the apparatus of the present invention, wherein the rotational speed difference generated between the input shaft 1 and the output shaft 2 is plotted along the abscissa, and the transmission torque from the input shaft 1 to the output shaft 2 is plotted along the ordinate.

In FIG. 4, a solid line shows characteristics in the case where a maximum exciting current is applied to the driving coil 7, the throttle member 60 is at the position shown in FIG. 1 and the communicating area between the second annular groove 53 and the annular groove 61 is the largest, and a broken line shows characteristics in the case where the driving coil 7 is in the non-exciting state, the throttle member 60 is at the position shown in FIG. 2 and the communicating area between the second annular groove 53 and the annular groove 61 is the smallest.

As it will be apparent from the graph of FIG. 4, according to the first invention of the apparatus of the present invention, by changing the exciting current to the driving coil 7, any suitable characteristics may be realized selectively from the two characteristics.

That is, in the case where the exciting current to the driving coil 7 is controlled responsive to the running states, an optimum four-wheel driving state is realized for very running state. For example, when detecting the engine speed and the vehicle speed respectively by sensors, and reducing the exciting current to the driving coil 7 to couple the front and rear wheels rigidly in the case where a predetermined corresponding relationship is not obtained between the two, a stable running on slippy roads such as snow and gravel roads can be realized. By detecting the steering angle by a sensor and increasing the current quantity to the driving coil 7 to realize a loose coupling state in the case where the steering angle is large, a tight-corner braking phenomenon at rapid turning can be prevented reliably. Moreover, by controlling the exciting current to the driving coil 7 depending upon the braking or acceleration, the stable braking and acceleration can be realized.

In the case where changes in generating pressure characteristics of the vane pump 3 in connection with the viscosity change of working oil is corrected, by changing the exciting current to be larger or smaller responsive to oil temperature in the oil tank T, regardless of the temperature change in the working oil, the constant transfer characteristics of the driving force can always be kept.

In the embodiment stated above, though it has been constructed such that the driving force is transmitted between the input shaft 1 and the output shaft 2 by generating hydraulic pressure of the vane pump 3 installed between the two shafts, the other hydraulic pumps such as a trochoid pump, an internal gear pump and the like may also be used in place of the vane pump.

In the aforesaid embodiment, though the coupling member 5 is disposed between the casing of the vane pump 3 and the output shaft 2, and the throttle member 60 and the iron core 63 as the magnetic member are arranged in the center position of the coupling member 5, their arrangements are not limited thereto. For example, the casing may be extended toward the coupling portion with the output shaft 2 without providing the coupling member 5, and the throttle member 60 and the iron core 63 are arranged on the extended portion. It also possible to arranged the two not on the casing side but on the portion which rotates and interlocks with the rotor 30.

As particularly described heretofore, in the first invention of a power transmission apparatus for vehicles of the present invention, by moving a throttle member which is disposed on the center of a rotor and a casing, and is rotated with interlocking with either the rotor or the casing, the area of oil passage on the discharge side of a hydraulic pump is changed responsive to the movement. Accordingly, the oil passage connected to the throttle member can be constructed very simply, and works involved in machining the oil passage and assembling the entire apparatus are considerably reduced.

Besides, since the throttle member is moved responsive to the excitation of a coil which is arranged around a magnetic member (iron core) coupled coaxially to the throttle member and supported nonrotatably, the wiring to the coil is simple.

In this way, the first invention is very effective in realizing a power transmission apparatus for vehicles capable of changing transfer characteristics of the driving force with a simple construction.

Next, another embodiment of the first invention will be described with reference to the drawing showing its configuration, and simultaneously, an example applying a second invention therein will also be explained.

Figure 5:
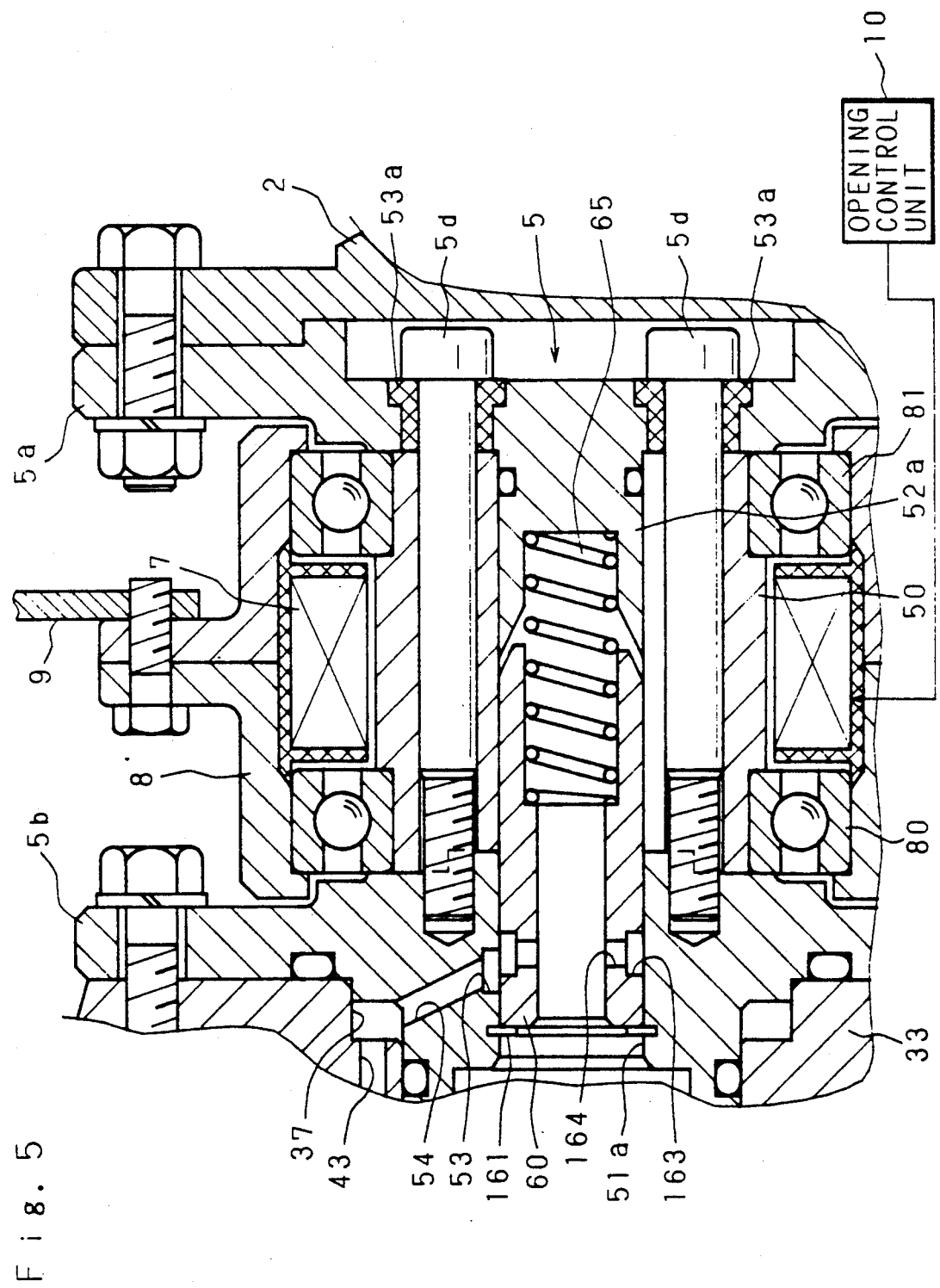
FIG. 5 and FIG. 6 are longitudinal sectional views showing examples of configuration of another embodiment of a first invention of the present invention.

FIG. 5 is an enlarged sectional view showing the configuration of characteristic portions of another embodiment of the first invention and the configuration in which the second invention is applied.

As basically same as the embodiment of the first invention aforementioned, the coupling member 5 is disposed between the pressure plate 33 and the output shaft 2 to couple the both, and to hold the throttle member 60 which controls the flow resistance in the oil discharge passage of the vane pump 3 by its movement. In this embodiment, however, a circular sectional cavity formed in the coupling member 5 is formed in the same diameter size throughout the entire length in the axial direction.

The coupling member 5 also clamps and secures a holding cylinder 50 which is formed in substantially a cylindrical shape, between separate coupling flanges 5a, 5b for coupling the output shaft 2 and the pressure plate 32. The holding cylinder 50 made of a non-magnetic member specifically is clamped by a plurality of fixing bolts 5d extending through the coupling flange 5a in a direction of thickness and the circumferential wall of the holding cylinder 50 longitudinally for engagement with the coupling flange 5b. Thereby, the coupling flange 5a, holding cylinder 50 and coupling flange 5b are coupled together in a unit, and the transmission torque from the pressure plate 33 to the output shaft 2 can be sufficiently born by the fixing bolts 5d together with the holding cylinder 50.

The coupling flange 5b on the pressure plate 33 side is formed annularly with a circular hole 51a which matches with the inside of the holding cylinder 50 in the center.

The throttle member 60 made of a magnetic member and formed cylindrically is inserted into the holding cylinder 50 slidably coaxially through the circular hole 51a. The throttle member 60 is urged to the left-hand side of FIG. 5, or toward the pressure plate 33 side, by a biasing spring 65 as the biasing member installed between the end portion of the other coupling flange 5a projecting into the holding cylinder 50 by a predetermined length.

A stop ring 161 is mounted around the inner wall near the open end of the circular hole 51a so as to restrict the sliding range of throttle member 60 to a range between the stop ring 161 and the end portion of the inner cavity of the coupling member 5.

A first annular groove 163 is formed annularly around the throttle member 60 a little close to the side end of the pressure plate 33. The first annular groove 163 is communicated with a cavity formed in the center of the throttle member 60 via a communicating hole 164 extending through the peripheral wall of the throttle member 60. In the inner wall of the circular hole 51a of the coupling flange 5b, a second annular groove 53 is formed annularly. The second annular groove 53 is communicated with the annular groove 37 formed on the outside wall of the pressure plate 33 via the communicating oil passage 54, by fixing the coupling flange 5b.

The first annular groove 163 and the second annular groove 53 are always in communication with each other as far as the throttle member 60 moves only within the sliding range aforementioned. Meanwhile, the annular groove 37 is communicated with respective pump chambers in the vane pump 3 via the oil guide hole 43, annular groove 47, receiving grooves of the vanes 30a and discharge port 41. The inside of the throttle member 60 is communicated with the oil tank T via the inner cavity of the pressure plate 33 and the circulating hole 49. That is, the throttle member 60 is disposed in the middle of the oil discharge passage which communicates discharge sides of respective pump chambers of the vane pump 3 to the oil tank T. Therefore, the throttle member 60 function to throttle by changing the communicating area produced between the first annular groove 163 and the second annular groove 53 responsive to its sliding quantity.

Figure 6:
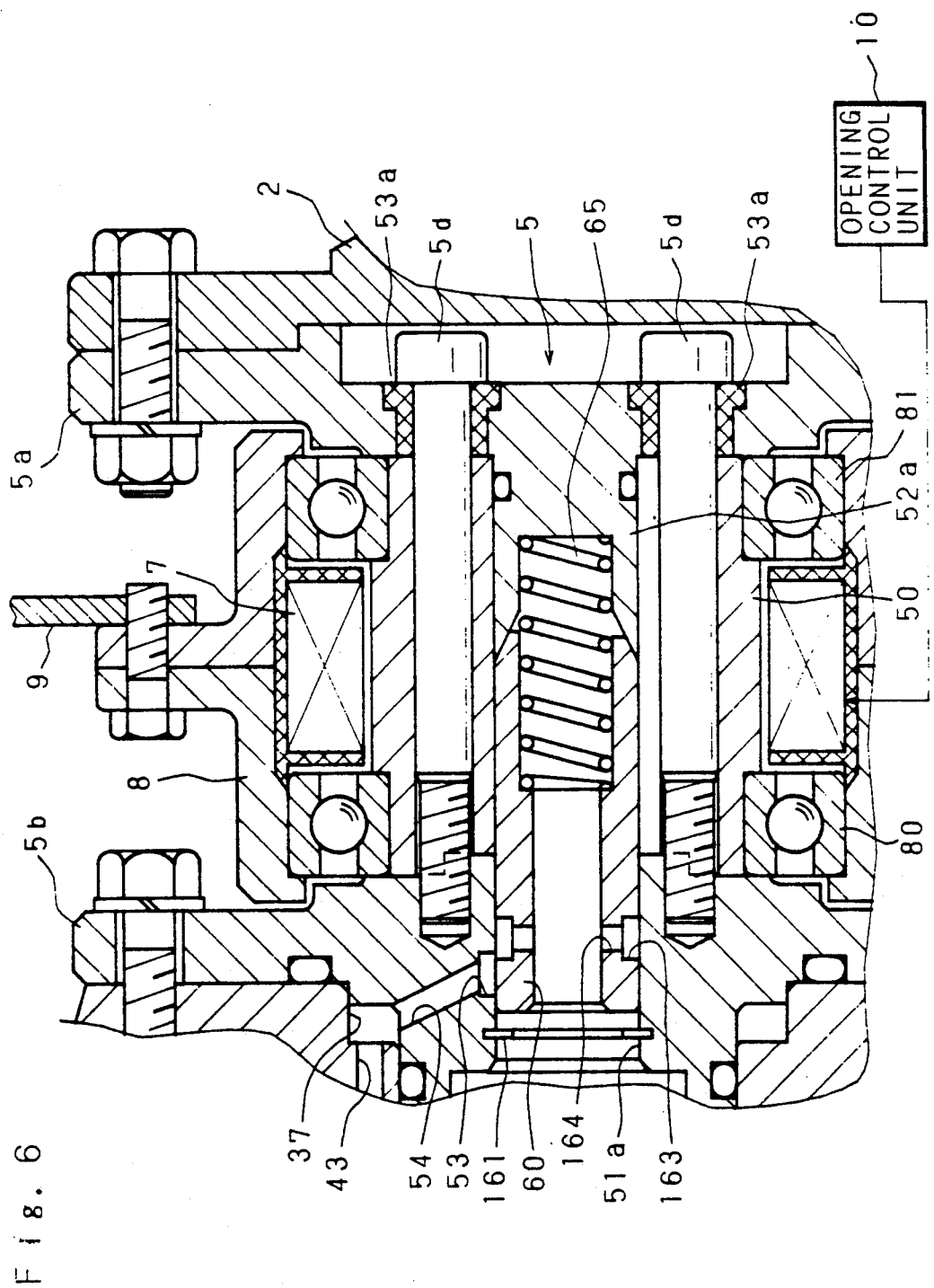

As shown in FIG. 5, the throttling area becomes largest when the throttle member 60 is pressed against the stop ring 161 by a spring force of the biasing spring 65, and becomes smaller as the throttle member 60 slides right-ward in FIG. 5 from this position against the spring force of the biasing spring 65. And, as shown in FIG. 6, the throttling area becomes smallest when the throttle member 60 contacts to the end portion of the inner cavity of the coupling member 5.

Sliding motion of the throttle member 60 is effected by a solenoid having an iron core consisting of the throttle member 60 itself, by action of the magnetic filed formed by the driving coil 7 surrounding the holding cylinder 50. In order to enable driving of the throttle member 60, the whole or part of the throttle member 60 is made of a magnetic material as aforementioned.

The driving coil 7 is inserted into the inner center portion of the supporting cylinder 8 serving as a supporting member which supports the holding cylinder 50 therein rotatably coaxially. The supporting cylinder 8 supports the holding cylinder 50 therein rotatably coaxially via a pair of ball bearings 80, 81 installed on both sides of the driving coil 7. In addition, the supporting cylinder 8 is made of a highly elastic member such as hard rubber, and is fixed nonrotatably to a fixed portion of a vehicle body via the coupling member 9.

By such a configuration, the driving coil 7 is installed adjacent to and around the holding cylinder 50 at the outside position of the holding cylinder 50. However, since the radial relative position of the holding cylinder 50 with respect to the supporting cylinder 8 is kept constant via the ball bearings 80, 81, the relative position of the driving coil 7 with respect to the throttle member 60 is not changed. Thus, there is no possibility that the radial relative position of the driving coil 7 with respect to the holding member 50 and the throttle member 60 located therein will fluctuate, or the holding cylinder 50 will collide with the driving coil 7 due to vibration of the vehicle body during driving.

In the case where the driving coil 7 is energized, a force directing against the biasing force of the biasing spring 65 is applied to the throttle member 60 by the action of magnetic filed generated thereby, thus the throttle member 60 slides right-ward in FIG. 5 to reduce the throttling area. At this time, the relative position of the driving coil 7 with respect to the throttle member 60 is constant as stated above, and the leakage of magnetic flux into the holding cylinder 50 does not occur since the holding cylinder 50 holding the throttle member 60 is made of non-magnetic member, so that the magnetic flux generated by energizing the driving coil 7 is focused stably on the position in the holding cylinder 50 where the throttle member 60 is disposed. Accordingly, the slide of the throttle member 60 and changes in throttling area in connection therewith are realized reliably and stably. Leakages of the magnetic flux abovementioned also takes place on the fixing bolts 5d which clamps and fixes the holding cylinder 50 between the coupling flanges 5a, 5b. However, the magnetic flux leakage can be solved by using the bolts made of stainless steel which is a non-magnetic material in the fixing bolts 5d, or, as shown, providing non-magnetic collars 53a at the portion of the coupling flange 5a through which the fixing bolts 5d are extended.

The driving coil 7 is energized in accordance with the energizing instruction given from the opening control unit 10, in response to the detection results of the running states such as the steering and speed of a vehicle onto which the apparatus of the present invention is installed.

Though the operation of another embodiment of the first invention thus constructed is basically similar to that of the aforesaid embodiment, there is a slight difference in transfer characteristics due to the structural difference of the throttle member 60.

Figure 7:
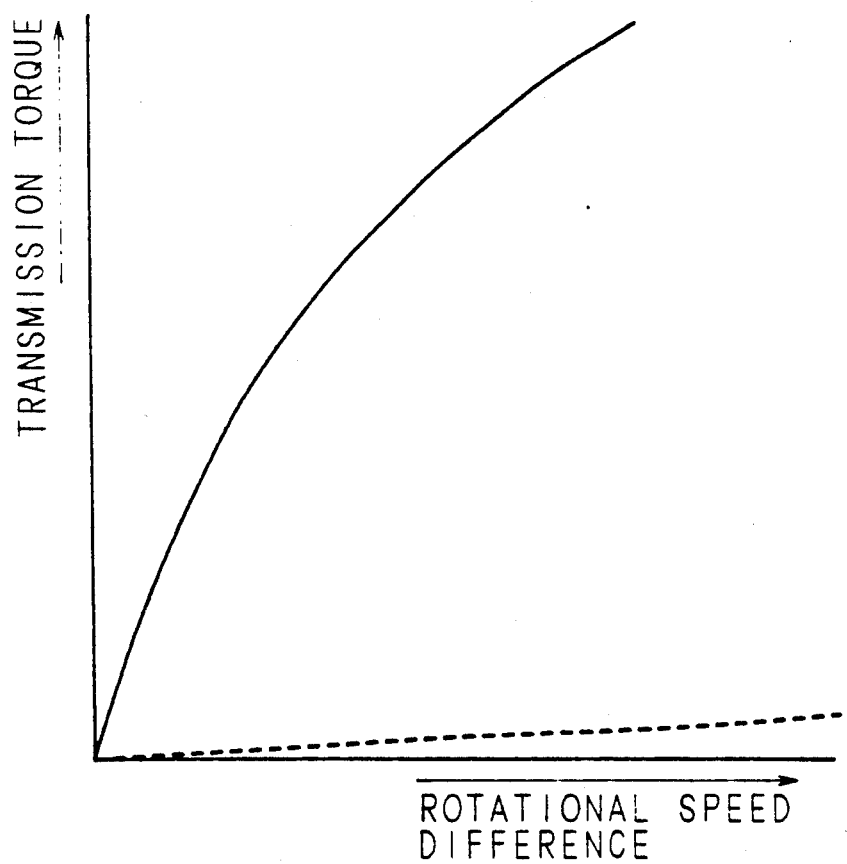
FIG. 7 is a graph showing transfer characteristics of a driving force between input/output shafts realized by an apparatus of an apparatus of the present invention shown in FIG. 5 and FIG. 6.

FIG. 7 is a graph showing an example of transfer characteristics realized by this embodiment. As same as a graph of FIG. 4 showing an example of transfer characteristics realized by the embodiment stated before, in FIG. 7, the rotational speed difference between the input shaft 1 and the output shaft 2 is plotted along the abscissa, and the transmission torque from the input shaft 1 to the output shaft 2 is plotted along the ordinate.

In FIG. 7, a solid line shows characteristics in the case where the throttle member 60 is at the position shown in FIG. 6 by energizing the driving coil 7, and the communicating area of the first annular groove 163 and the second annular groove 53 is the smallest, and a broken line shows characteristics in the case where the driving coil 7 is deenergized, the throttle member 60 is at the sliding position shown in FIG. 5 and the communicating area of the first annular groove 163 and the second annular groove 53 is the largest.

For example, in the case where one of the front and rear wheels of a four-wheel drive vehicle is connected to the input shaft 1 of an apparatus of the present invention and the other to the output shaft 2 thereof, when the former characteristics is obtained, a rigid coupling state is realized between the input shaft 1 and the output shaft 2, and responsive to a minor slide generated in either of the front and rear wheels, a large driving force is transmitted to the other, so that it is possible to run stably on slippy roads such as snow and gravel roads.

In the case where the latter characteristics is obtained, a loose coupling state is obtained between the input shaft 1 and the output shaft 2, and during turning at low speed, the rotational speed difference between the two wheels generated by the difference of turning loci of front and rear wheels is absorbed smoothly, so that it is effective in preventing a tight corner braking phenomenon.

By changing the energizing current to the driving coil 7 continuously to set the sliding position of the throttle member 60 suitably, the transfer characteristics between the solid and broken lines in FIG. 7 can be selected. In the case where such intermediate transfer characteristics can be set, responsive to the running states such as the vehicle speed and steering or depending upon choices of the driver, any appropriate transfer characteristic can be selected.

In the second invention, since the slide of the throttle member 60 in connection with energizing of the driving coil 7 is effected reliably and stably, a desired transfer characteristics can be realized reliably.

As particularly described, in the second invention, by holding the throttle member and the iron core which is a magnetic member formed in a unit therewith in the holding cylinder made of a non-magnetic material, and by clamping and fixing the holding cylinder by fixing bolts which are bridged between a pair of coupling flanges so as to be disposed between the transmission shafts corresponding to the casing or rotor, the throttle member is arranged in the center of the casing. Meanwhile, the driving coil is fixed to the supporting cylinder which supports the holding cylinder rotatably coaxially to mount the supporting cylinder nonrotatably. Therefore, the magnetic flux leakage into the holding cylinder can be prevented reliably without reducing the strength of the holding cylinder which functions also as a coupling member, and the radial relative position of the iron core with respect to the driving coil can be kept constant, so that the generating magnetic field of the driving coil is focused on the position where the iron core and the throttle member are arranged. Accordingly, the present invention is very effective in securing movement of the throttle member produced by the action of generating magnetic field of the driving coil, and changes in transfer characteristics realized thereby reliably.

Next, a third invention of a power transmission apparatus for vehicles of the present invention will be described in detail with reference to the drawings showing its embodiment.

Figure 8:
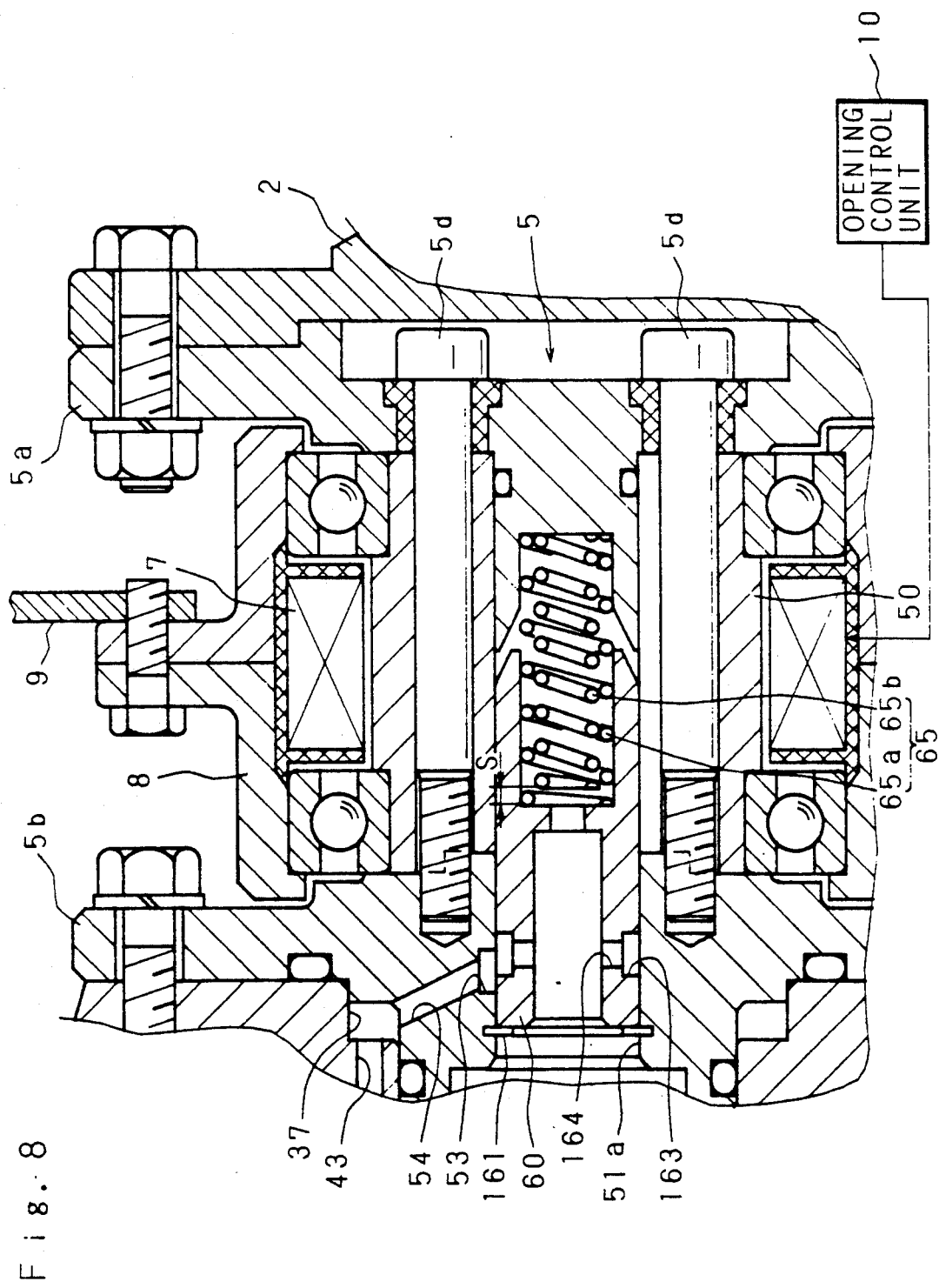
FIG. 8 and FIG. 9 are longitudinal sectional views showing an example of configuration of one embodiment of a third invention of an apparatus of the present invention.
Figure 9:
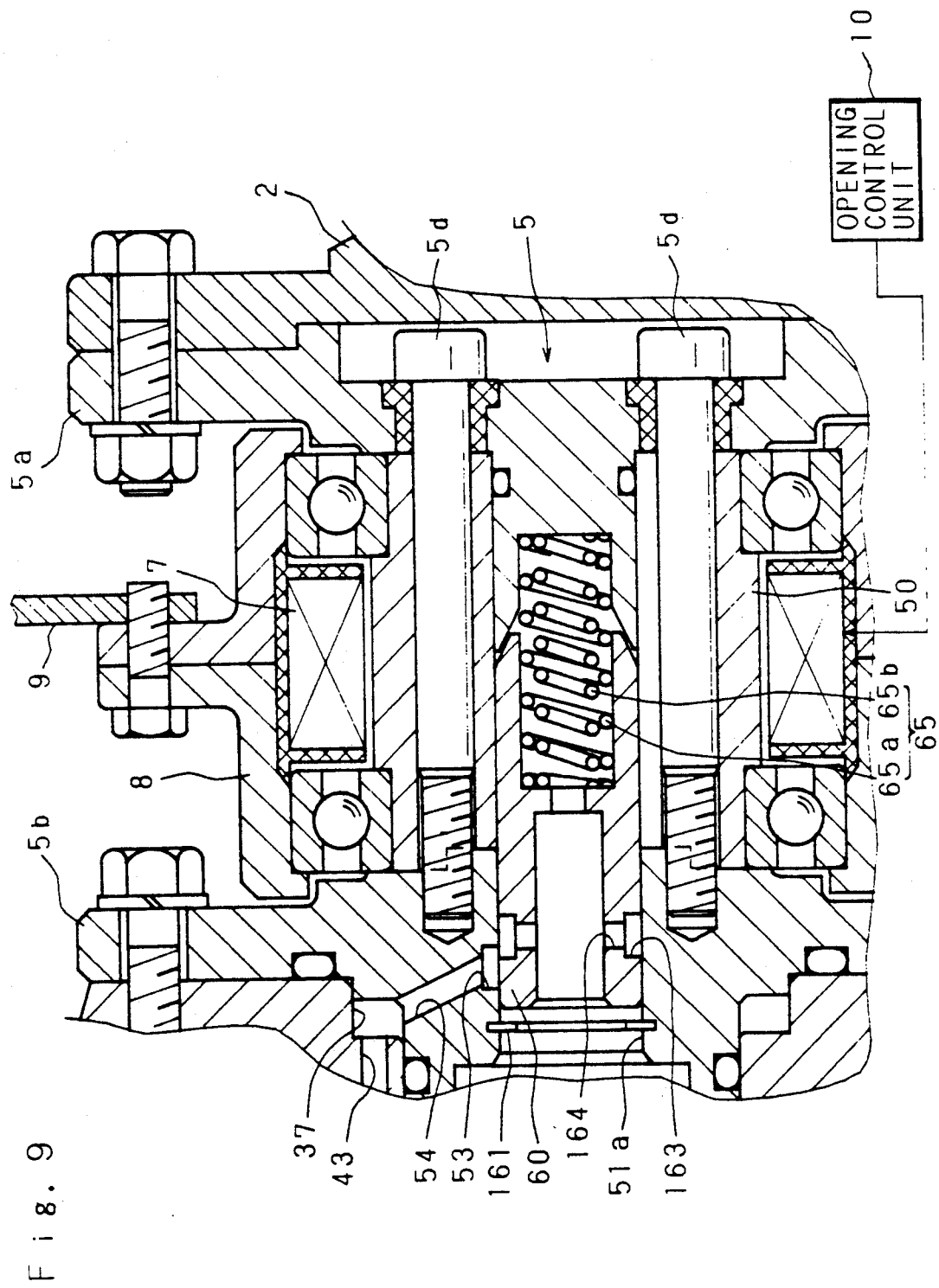

FIG. 8 and FIG. 9 are enlarged sectional views showing the coupling member 5 and its periphery which is a characteristic portion of the third invention. Though the third invention has basically the same configuration as the second invention stated above, the biasing spring 65 as a biasing member is constituted by a plurality of coil springs.

Now, as shown in FIG. 8 and FIG. 9 in this embodiment, the biasing spring 65 is constituted by arranging coaxially two coil springs 65a, 65b having different diameters from each other.

The throttle member 60 is pressed against the stop ring 161 by the biasing force of the coil spring 65a having a large diameter as shown in FIG. 8, and in this case, the other coil spring 65b with small diameter is designed to space at its tip a predetermined distance S from the opposing end face of the throttle member 60. Accordingly, while the throttle member 60 can be slid against a relatively small biasing force of only the large diameter coil spring 65a till the sliding distance reaches the predetermined distance S, after the sliding distance has reached the predetermined distance S and contacted to the tip of the reduced diameter coil spring 65b as shown in FIG. 9, the action of force against a relatively large biasing force of the two coil springs 65a, 65b is required. This means that the throttle member 60 can be positioned relatively easily at the position of distance S to which the throttle member 60 slides, or the position shown in FIG. 9. Therefore, by adjusting the energizing current to the driving coil 7 roughly, the sliding position of the throttle member 60 shown in FIG. 9 can be simply realized.

That is, in the apparatus of the present invention, by roughly adjusting the energizing current to the driving coil 7 in two steps, the tow-step control of the throttle member 60 can be realized at the sliding position shown in FIG. 9 and the sliding position where contact to the coupling flange 5a has taken place. Accordingly, the throttle member 60 can be controlled at the sliding positions of three steps, as well as the sliding position shown in FIG. 8 when the driving coil 7 is deenergized. In other words, three-step throttle opening by the throttle member 60 can be realized reliably and simply.

Though spring constants of the coil springs 65a and 65b may be set suitably, when the spring constant of the large diameter coil spring 65a is set sufficiently smaller than that of the reduced diameter coil spring 65b to make the difference between the biasing force of the former and that of both be larger, allowance of energizing current to the driving coil 7 necessary for keeping the medium throttle opening shown in FIG. 9 can be set larger.

In the third invention thus constructed, by switching the energizing current to the driving coil 7 in two ways as aforementioned, three-step throttle openings, "small", "medium", and "large", can be realized including that of deenergizing. Among these, when realizing the "small" and "medium" throttle opening, not only the "small" throttle opening which requires the throttle member 60 to slide as far as the sliding limit position, but also the "medium" throttle opening which requires the medium sliding position can be realized reliably by roughly adjusting the energizing current to the driving coil 7 as stated above.

That is, in the opening control unit 10 which controls the energizing current to the driving coil 7, only two rough switchings are required in response to the detection results of the running states and complicated operations are not necessary, moreover, a high accuracy is not required for the driving coil 7 to produce magnetic fields corresponding accurately to the energizing currents, thus the three-step throttle opening aforementioned can be realized and three-step transfer characteristics corresponding respectively thereto can be obtained by the simple configuration.

Figure 10:
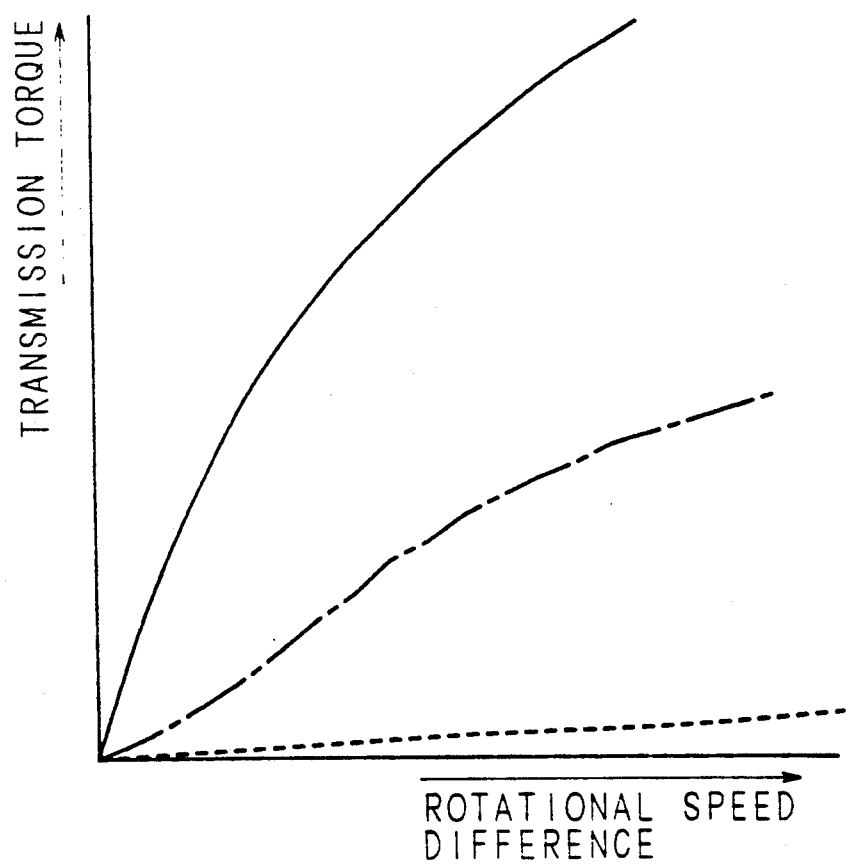
FIG. 10 is a graph showing transfer characteristics of a driving force between input/output shafts realized by a third invention of an apparatus of the present invention.

FIG. 10 is a graph showing an example of transfer characteristics realized by the third invention of the apparatus of the present invention. In FIG. 10, the rotational speed difference between the input shaft 1 and the output shaft 2 is plotted along the abscissa, and the transmission torque from the input shaft 1 to the output shaft 2 is plotted along the ordinate.

In FIG. 10, a solid line indicates characteristics in the case where the "small" throttle area is obtained by the large energizing current to the driving coil 7, a broken line indicates characteristics in the case where the "large" throttle area is obtained by deenergizing the driving coil 7, and an one-dot-chain line indicates characteristics in the case where the "medium" throttle area is obtained by a predetermined energizing current to the driving coil 7.

When the characteristics indicated by the solid line is obtained, since the input shaft 1 and the output shaft 2 are coupled substantially directly, in the case where one of the front and rear wheels of a four-wheel drive vehicle is connected to the input shaft 1 of the apparatus of the present invention, and the other to the output shaft 2, it is possible to get out from the state where one of the front and rear wheels is idling, a so-called stacking state due to running into a snow or sand drift.

When the characteristics indicated by the one-dot-chain line is obtained, since the input shaft 1 and the output shaft 2 are coupled rigidly, responsive to a minor slide generated in either the front or rear wheels, a relatively large driving force is transmitted to the other, thus it is possible to run stably on slippy roads such as snow and gravel roads.

Furthermore, when the characteristics indicated by the broken line is obtained, since the input shaft 1 and the output shaft 2 are coupled loosely, the rotational speed difference of the two wheels generated by the difference of turning loci between the front and rear wheels during the low speed turning can be absorbed, thus it is effective in preventing the occurrence of tight corner braking phenomenon.

In this way, in the third invention of the apparatus of the present invention, since the three step transfer characteristics can be obtained by only controlling the energizing current to the driving coil 7 by the opening control unit 10 of simple configuration, when the apparatus of the present invention is installed on the four-wheel drive vehicle, four-wheel driving states suitable for the running states are realized.

Figure 11:
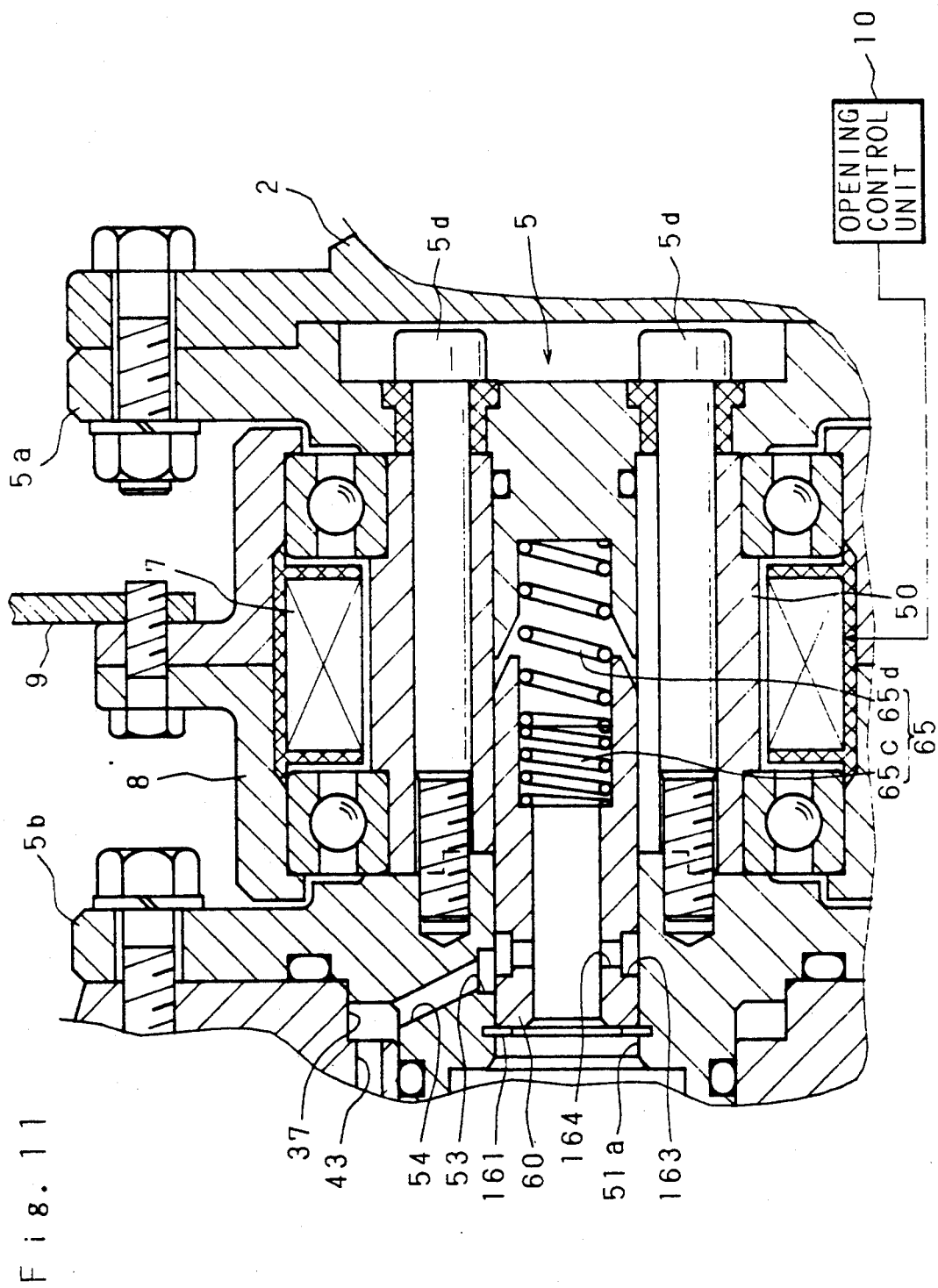
FIG. 11 is a longitudinal sectional view showing an example of configuration of another embodiment of a third invention of an apparatus of the present invention.

In the aforesaid description, though the coil springs 65a and 65b are arranged coaxially in parallel to constitute the biasing spring 65, for example, as shown in FIG. 11, the biasing spring 65 may be constituted by arranging the coil springs 65c, 65d having each different spring constant from each other in series. When adopting such a configuration, the throttle member 60 may be kept at the medium sliding position where only the coil spring 65c having a smaller spring constant is completely contracted by adjusting the energizing current to the driving coil 7, so that, as same as the case aforementioned, three-step transfer characteristics can be obtained. Also in this case, however, in order to keep the sliding position of the throttle member 60 reliably, the spring constant of the coil spring 65d must be set sufficiently larger than that of the other coil spring 65c.

In either of these embodiments, the number of coil springs constituting the biasing spring 65 is not necessarily limited to two, but three or more coil springs may be used. In case of adopting such a configuration, it is possible to select more steps of transfer characteristics. Also, these coil springs are not limited to be disposed coaxially as shown in the aforesaid embodiments, but they may be arranged in other various states such as disposing about the axis of the throttle member 60 at equal intervals.

Meanwhile, it will also be appreciated that the biasing spring 65 may be constituted by springs other than the coil spring.

Figure 12:
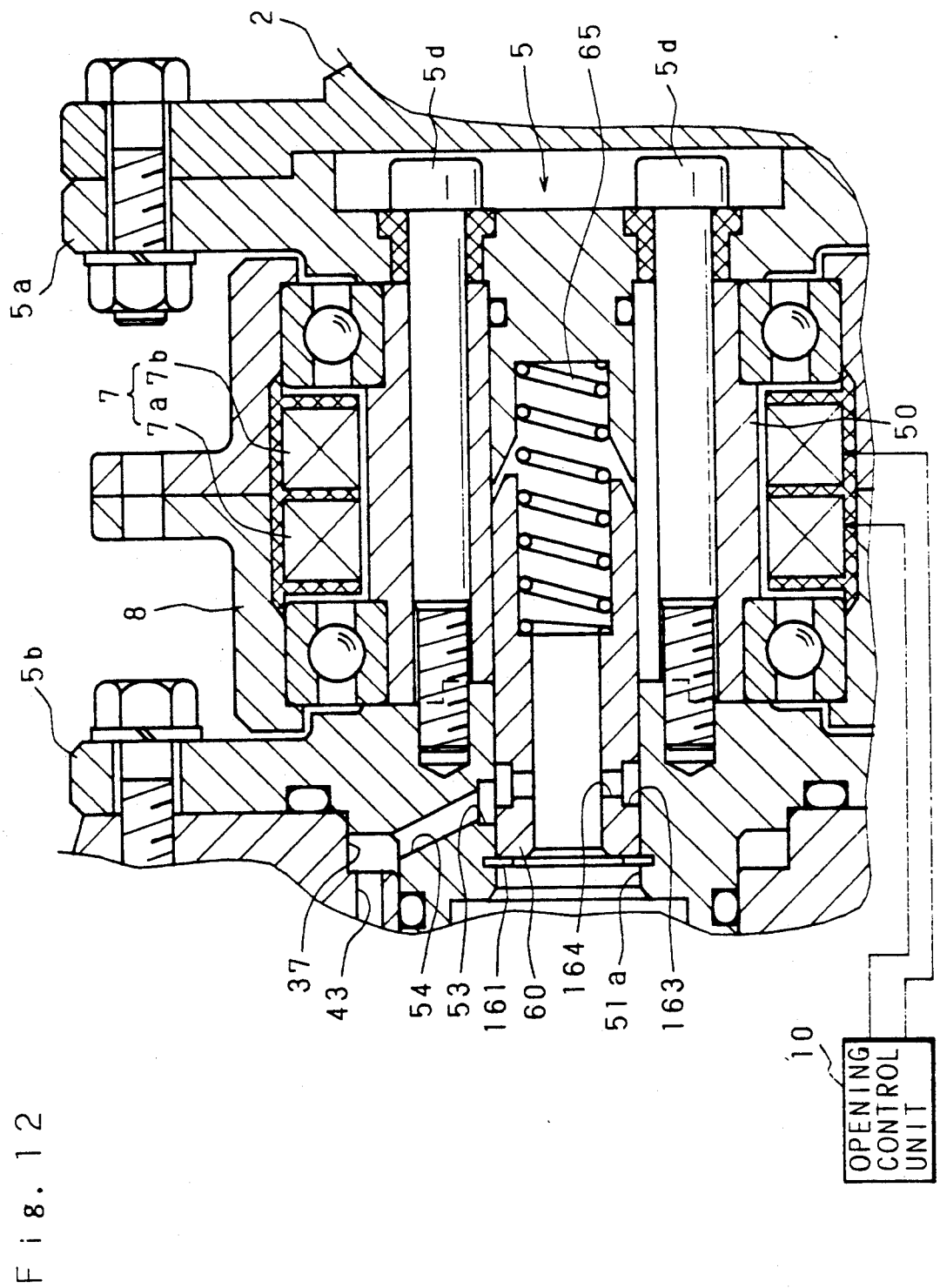
FIG. 12 is a longitudinal sectional view showing an example of configuration of one embodiment of a fourth invention of an apparatus of the present invention.

FIG. 12 is an enlarged sectional view of essential portions showing the configuration of one embodiment of a fourth invention of an apparatus of the present invention. Though, the fourth invention adopts basically the same configuration as the second invention aforementioned, the driving coil 7 is constituted by a plurality of coils.

In FIG. 12, though the biasing spring 65 which urges the throttle member 60 is constituted by one coil spring as same as the first and second inventions, the driving coil 7 is constituted by two coils 7a, 7b which can be energized separately and are disposed axially in parallel.

By energizing the coils 7a, 7b selectively, the exciting state of only one of the coils or that of two coils can be selected, and by producing two-step magnetic fields being different from each other for the throttle member 60, three-step transfer characteristics including the case wherein both the coils 7a, and 7b are not in the exciting state are realized.

In case of adopting such a configuration, the opening control unit 10 which controls the energizing current to the driving coil 7 may just have a function to supply or cut the current to the coils 7a, 7b separately, so that the configuration never becomes complicated. It is to be understood that, also in the fourth invention, more steps of transfer characteristics can be obtained by constituting the driving coil 7 by three or more coils in the same way as the third invention wherein the biasing spring 65 is constituted by three or more coil springs.

Positions where the throttle member 60 and the driving coil 7 are disposed are not limited to those shown in the figure, they may be located at any places as far as on the discharge side of the vane pump 3. The driving coil 7, however, is desirable to be stationary taking into account of simplicity in applying the current thereto. Meanwhile, in the vane pump 3, since the rotor 30 as well as the casing are rotated, the location of the driving coil 7 is restricted, and further, the location of the throttle member 60 which moves by the action of generating magnetic field of the driving coil 7 is also restricted.

As particularly described above, in the third and fourth inventions, a simple configuration is adopted to urge the throttle member which is disposed on the discharge side of the hydraulic pump generating hydraulic pressure which serves as a transfer medium of the driving force, and moves to control the oil flow resistance on the discharge side, by a plurality of springs, or to include a driving coil constituted by arranging a plurality of coils in a driving solenoid of the throttle member. Thereby, plural steps of transfer characteristics can be realized without forcing the complicated control to the current controller to the solenoid, thus the present invention is very effective in improving reliability and reducing the product cost.

Next, a fifth invention of a power transmission apparatus for vehicles of the present invention will be described with reference to the drawings showing an example of configuration of its embodiment.

In the fifth invention, though the opening of the throttle member 60 is controlled by the opening control unit 10 in the same way as the inventions described heretofore, the opening of the throttle member 60 is controlled suitably responsive to various state quantities (vehicle speed, turning state etc.) of a four-wheel drive vehicle onto which the apparatus of the invention is installed.

Figure 13:
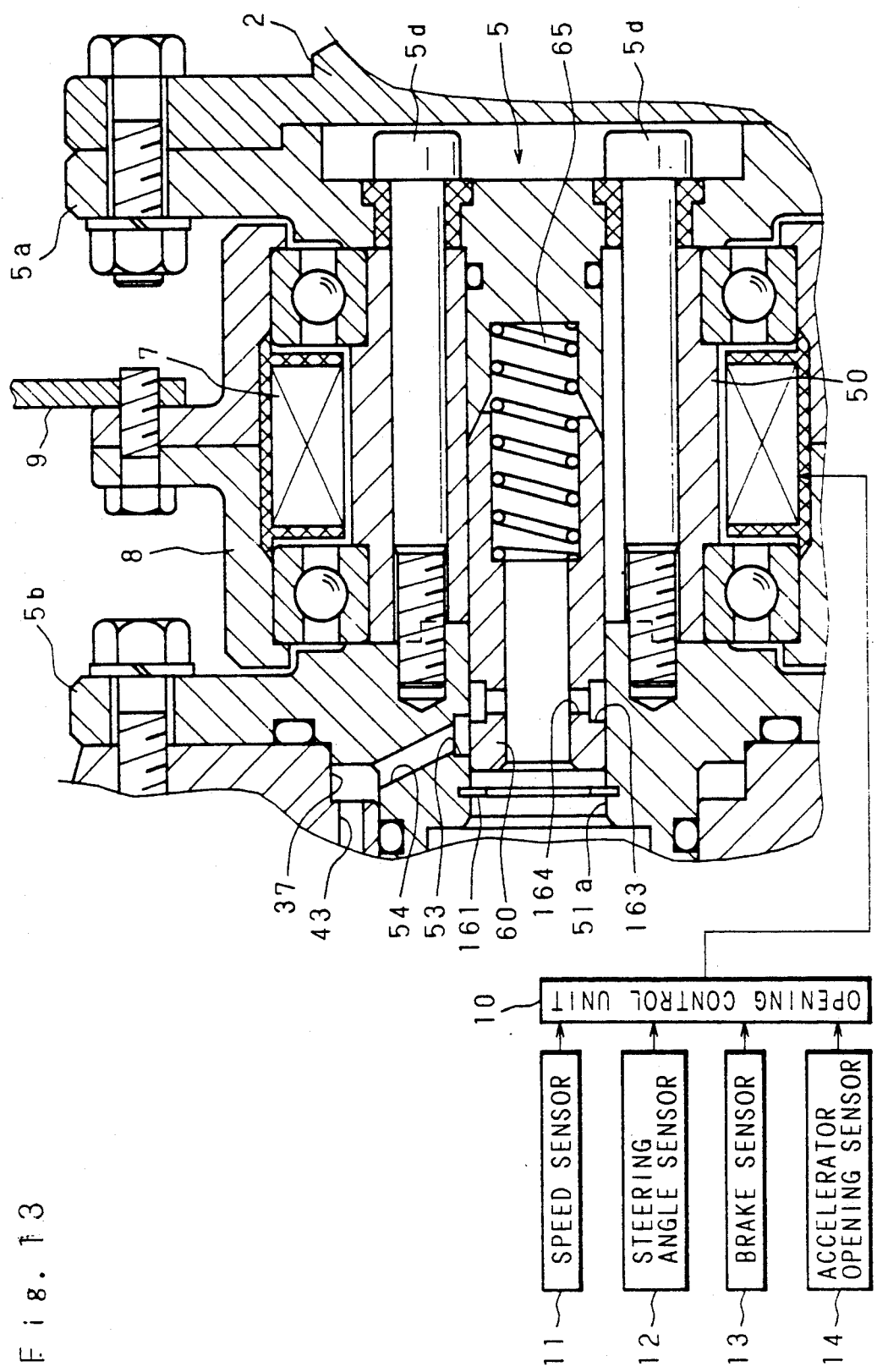
FIG. 13 is a longitudinal sectional view showing an example of configuration of one embodiment of a fifth invention of an apparatus of the present invention.

FIG. 13 is a block diagram of a control system shown together with an enlarged sectional view of the coupling member 5 and its periphery for indicating characteristic portions of a first embodiment of the fifth invention.

As shown in FIG. 13, in the embodiment, it is so constructed that the opening of the throttle member 60 can be controlled in two steps by the configuration of the second invention shown in FIG. 5 stated above, and the control is effected by the opening control unit 10 according to the detection results of various sensors.

That is, to the input side of the opening control unit 10, a speed sensor 11, a steering angle sensor 12, a brake sensor 13 and an accelerator opening sensor 14 are connected. The opening control unit 10 controls the opening of the throttle member 60 according to the detection results of various state quantities related to the running states of a four-wheel drive vehicle onto which the apparatus of the present invention is installed, from the respective sensors 11, 12, 13 and 14.

The opening control unit 10 respectively recognizes the present vehicle speed from the vehicle speed sensor 11, the present steering angle from the steering angle sensor 12, the braking operation from the input from the brake sensor 13 and the present accelerator opening from the accelerator opening sensor 14. The opening control unit 10 gives opening instructions not by the individual detection results, but in response to combination thereof. For example, in this embodiment, the opening instructions are given stepwisely in two steps of "open" and "close".

Since the energizing current to the driving coil 7 is interrupted when the "open" instruction is given from the opening control unit 10, the throttle member 60 slides leftward in FIG. 13 by the spring force of the biasing spring 65 and contacts to the stop ring 161, thereby the largest throttle opening as shown in FIG. 5 is obtained. On the contrary, when the "close" instruction is given from the opening control unit 10, by the action of magnetic filed generated by energizing the driving coil 7, the throttle member 60 slides right-ward in FIG. 5 against the spring force of the biasing spring 65 and contacts to the end portion of the coupling flange 5a, thereby the smallest throttle opening as shown in FIG. 6 and FIG. 13 is obtained.

Transfer characteristics of the throttle member 60 at respective openings in the embodiment of the fifth invention as described above are similar to the case of the second invention shown in FIG. 7.

In the fifth invention, however, the case of selecting the transfer characteristic shown by the solid line in FIG. 7 is called a P (power) mode, and the case of selecting the transfer characteristic shown by the broken line is called an S (small) mode.

In the opening control unit 10, in response to respective detection results of the vehicle speed sensor 11, steering angle sensor 12, brake sensor 13 and accelerator opening sensor 14, for example, the "open" or "close" instruction is given according to a logic shown in Table 1.

TABLE 1

|  | 1 | 2 | 3 | 4 | 5 |
| --- | --- | --- | --- | --- | --- |
| Speed (Km/h) | 0 | <10 | <10 | ≦10 | ≦10 |
| Steering Angle | — | large | large | — | — |
| Brake | — | — | — | — | — |
| Accelerator | Fully Open | — | Fully Open | — | — |
| Instruction | Close | Open | Close | Close | Open |

First, in the case where the accelerator opening sensor 14 detects that the accelerator is substantially fully open irrespective of the vehicle speed detected by the vehicle speed sensor 11 being about 0, the opening control unit 10 gives the "close" instruction (first state).

The first state is regarded as a state wherein a vehicle runs into a snow or sand drift and one of the front and rear wheels is idling, a so-called stuck state. Accordingly, since the front and rear wheels are substantially coupled directly according to the "close" instruction by the opening control unit 10, a large driving force is transmitted to the wheels which are not idling, thus it is possible to get out from the stuck state.

In this case, incidentally, the detection results of steering angle detected by the steering angle sensor 12, and the braking operation detected by the brake sensor 13 are not referred to.

Next, in the case where the vehicle speed detected by the speed sensor 11 is below a predetermined value (e.g. 10 km/h) of relatively low speed set in advance, and the steering angle detected by the steering angle sensor 12 is large, the opening control unit 10 gives the "open" instruction (second state).

The second state is regarded as a state wherein rapid turning at low speed is taking place. In this case, according to the "open" instruction by the opening control unit 10, a state close to the two-wheel drive is obtained, and the rotational speed difference of the two wheels generated by the difference in turning loci between the front and rear wheels is absorbed smoothly, thus it is effective in preventing the occurrence of a so-called tight corner braking phenomenon.

Also in this second state, however, when the accelerator opening sensor 14 detects that the accelerator is substantially fully open, the opening control unit 10 gives the "close" instruction (third state).

The third state corresponds to a state where the vehicle is turning on roads with a small friction factor (low $\mu$ roads) such as snow road, dirt road etc., wherein by realizing the direct coupling according to the "close" instruction by the opening control unit 10, a stable running is made possible.

In this case, incidentally, there is no possibility of incurring a so-called tight corner breaking phenomenon, since the rotational speed difference caused by the difference in turning loci is absorbed by the slide on the road.

Meanwhile, in the case where the vehicle speed detected by the speed sensor 11 is above the predetermined value aforementioned, irrespective of the steering angle detected by the steering angle sensor 12 and the detection result of the accelerator opening sensor 14, the opening control unit 10 gives the "close" instruction (fourth state).

The fourth state corresponds to a state wherein the vehicle is running straight or turning at high speed, and the front and rear wheels are substantially coupled directly according to the "close" instruction by the opening control unit 10. As a result, responsive to a minor slide generated in either the front or rear wheels, a large driving force is transmitted to the other, improving running stability.

During the turning at high speed, the difference in turning loci between the front and rear wheels is little, and there is no possibility of incurring the aforesaid tight corner braking phenomenon, thus there is not much inconvenience incurred by realizing the direct coupling of the front and rear wheels.

Also in this case, however, when the braking operation is detected by the brake sensor 13, the opening control unit 10 gives the "open" instruction (fifth state). This operation is necessary only for vehicles provided with an ABS (Anti-skid Brake System). As well known, the ABS is a system which is designed to avoid the wheel lock and enable the stable braking, by controlling individually the braking force exerted on respective wheels according to the braking operation, for the appropriate rotational speed difference between respective wheels. Since such control by the ABS is hindered by coupling the front and rear wheels directly, the opening control unit 10 gives the "open" instruction in the case where the ABS is operated. Accordingly, since the front and rear wheels are coupled loosely by the "open" instruction given in response to the braking operation detected by the brake sensor 13, the stable braking by the ABS operation is not hindered.

Though transfer characteristics adaptable to various running states is realized by the operation of the opening control unit 10 aforementioned, at this time, the opening control unit 10 only energizes or interrupts the driving coil 7 in response to the combined detection results of state quantities related to the running states, and operates simply to change the throttle opening in two steps by the throttle member 60 which slides accordingly, thus there is no need of complicated configuration.

Figure 14:
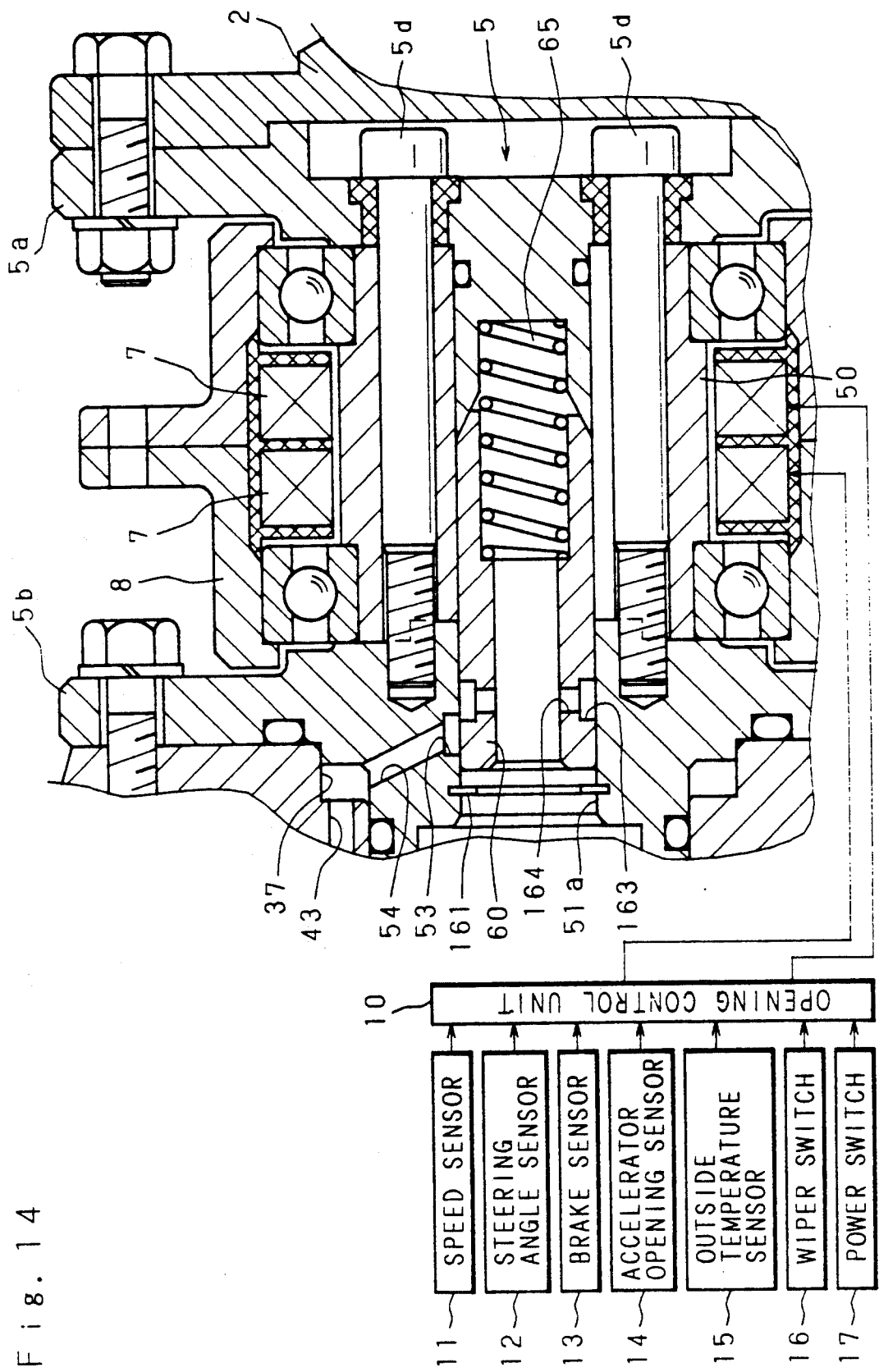
FIG. 14 is a longitudinal sectional view showing an example of configuration of a second embodiment of a fifth invention of an apparatus of the present invention.

FIG. 14 is a block diagram of a control system shown together with an enlarged sectional view of a coupling member 5 and its periphery for showing characteristic portions of a second embodiment of the fifth invention.

As shown in FIG. 14, in this embodiment, it is so constructed that the opening of the throttle member 60 can be controlled in three steps by the configuration of the fourth invention shown in FIG. 12 aforementioned, and this control is effected by the opening control unit 10 according to the detection results of various sensors or a manual switch.

That is, various sensors such as a speed sensor 11, steering angle sensor 12, the braking operation detected by the brake sensor 13, accelerator opening sensor 14 and outside temperature sensor 15 are connected to the input side of the opening control unit 10. Also, a wiper switch 16 and a power switch (PSW) 17 are connected to the opening control unit 10. The power switch 17 is the manual switch for making the opening of the throttle member 60 be the "small" state among the three steps to bring transfer characteristics of the vane pump 3, or the apparatus of the present invention to the state shown by the solid line in the graph of FIG. 10, in the case where the driver of a four-wheel drive vehicle onto which the apparatus of the present invention is installed turns it on manually. In other words, by turning on the power switch 17, the front and rear wheels of the four-wheel drive vehicle onto which the apparatus of the present invention is installed can be substantially coupled directly forcibly (P-mode to be described later).

The opening control unit 10 controls the opening of the throttle member 60 according to various state quantities related to the running states of the vehicle given from the sensors 11 through 15, and the detection results of ON/OFF states of the wiper switch 16 and the power switch 17.

In the following, it will be described more specifically.

The opening control unit 10 calculates the engine speed from the detection results of the speed sensor 11 and the accelerator opening sensor 14. Also, lateral acceleration (lateral G) is calculated from the detection results of the speed sensor 11 and the steering angle sensor 12. Then, the vehicle speed detection result and the calculated results of the engine speed and the lateral G are compared with threshold values respectively set in advance, and referring to the comparison results, the ABS operating state detected by the brake sensor 13 and the ON/OFF state of the power switch 17, one out of three kinds of characteristics aforementioned is selected according to logic shown in Table 2.

Then, the opening control unit 10 gives the opening instruction of the throttle member 60 in response to, not the respective calculated results, but their combination. The opening instruction by the opening control unit 10 is made, stepwisely of three steps of, for example, "large", "medium" and "small".

For example, in the case where the "large" instruction is given from the opening control unit 10, the energizing current to the driving coil 7 is interrupted, thereby the throttle member 60 slides left-ward in FIG. 14 by the spring force of the biasing spring 65 and contacts to the stop ring 161, thus the "large" throttle opening as shown in FIG. 14 is obtained.

In the case where the "medium" instruction is given from the opening control unit 10, by the action of magnetic filed generated according to a relatively small energizing current to the driving coil 7, the throttle member 60 slides right-ward in FIG. 12 against the spring force of the biasing spring 65, so that the "medium" throttle opening is obtained as aforementioned.

Meanwhile, in the case where the "small" instruction is given from the opening control unit 10 by the action of magnetic field generated according to a relatively large energizing current to the driving coil 7, the throttle member 60 slides right-ward in FIG. 14 against the spring force of coil the biasing spring 65 and contacts to the end portion of the coupling flange 5a, thereby the "small" throttle opening as shown in FIG. 14 is obtained.

Transfer characteristics of the throttle member 60 at respective openings stated above in the second embodiment of the fifth invention are same as the case of aforesaid fourth invention shown in FIG. 10.

In the second embodiment of the fifth invention, however, the case wherein the transfer characteristics shown by the solid line in FIG. 10 is selected is called a P (power) mode, the case wherein the transfer characteristics shown by the one-dot-chain line is selected is called an N (normal) mode and the case wherein the transfer characteristics shown by the broken line is selected is called an S (small) mode.

Now, selection of three-step transfer characteristics stated above or the mode selection is effected in accordance with the opening instructions from the opening control unit 10. In the opening control unit 10, in response to the state quantity calculated from respective detection results by the aforesaid sensors 11, 12, 13 and 15, and further, to the ON/OFF states of the wiper switch 16 and the power switch 17, for example, the mode is selected according to a logic table shown in Table 2, and the opening of the throttle member 60 corresponding to the selected mode is instructed.

TABLE 2

|  | Vehicle Speed | Engine Speed | Lateral G | ABS | PSW | Mode |
|---|---|---|---|---|---|---|
| 1 | L | L | L | OFF | OFF | N |
| 2 | H | L | L | OFF | OFF | N |
| 3 | L | H | L | OFF | OFF | P |
| 4 | H | H | L | OFF | OFF | P |
| 5 | L | L | M | OFF | OFF | N |
| 6 | H | L | M | OFF | OFF | P |
| 7 | H | H | M | OFF | OFF | P |
| 8 | L | H | M | OFF | OFF | P |
| 9 | L | L | H | OFF | OFF | N |
| 10 | L | H | H | OFF | OFF | P |
| 11 | H | L | H | OFF | OFF | N |
| 12 | H | H | H | OFF | OFF | N |
| 13 | — | — | — | ON | OFF | S |
| 14 | — | — | — | ON | ON | S |
| 15 | — | — | — | OFF | ON | P |

In Table 2, the first through fifteenth states are defined. Also, in Table 2, respective state quantities are defined as follows. The vehicle speed is defined as "H" for the relatively high speed above 30 km/h, and "L" for the relatively low speed below 30 km/h. The engine speed is defined as "H" for the speed above 4500 rpm which is regarded as the accelerating state, and "L" for the speed below 4500 rpm which not regarded as the accelerating state. The lateral G is defined as "L" below 0.1 which is regarded as the slow turning or substantially straight running, "M" for the range above 0.1 and below 0.4 which is regarded as the turning state on the low μ road (road with low friction factor 1 and "H" above 0.4 which is regarded as the turning state on the high μ road. The ABS is ON at operation and OFF at non-operation. The PSW is defined as ON when the power switch 17 is turned on and OFF when it is turned off.

In the first through twelfth state, both the ABS and PSW are OFF.

The lateral G is small in the first through fourth state, which means that these are in the straight running or turning state. In the respective states, occurrence of acceleration determined by the engine speed is the reference for selecting the mode. That is, when the engine speed is high, it is regarded as the accelerating state and the P mode is selected, and when the engine speed is low, it is regarded an decelerating state and the N mode is selected. Thereby, the P mode close to the directly coupled four-wheel driving state is selected at acceleration to improve the accelerating performance. On the other hand, the medium N mode is selected at the ordinary running at low speed and high speed, thereby the stable running is realized and switching over to the braking state is carried out smoothly to be described later.

The fifth through eighth states are the turning states wherein a medium lateral G starts to function. In these states, only in the case where vehicle speed and engine speed are low, the N mode is selected, and for the other cases the P mode is selected. That is, only in the case where a certain degree of lateral G is detected irrespective of the low-engine speed at low speed, the N mode is selected for switching over to the braking state anticipated thereafter, and for the other cases the P mode close to the directly coupled four-wheel driving state is selected, thereby the turning performance as well as the accelerating performance are improved.

The ninth through twelfth states are the turning states where the large G functions, or the rapid turning states on the roads with large friction factor (high μ road). In these states, the P mode is selected only in the case where it is regarded as the accelerating state at low speed where the vehicle speed is low and the engine speed is high, and for other cases the N mode is selected. This is for avoiding a tight corner braking phenomenon which occurs when the directly coupled four-wheel driving state is realized. Accordingly, at the low speed running where there is little possibility of occurrence of the tight corner braking phenomenon, the P mode is selected taking into account of improving the accelerating performance.

The thirteenth through fifteenth states are the control in which priority is given to the ABS and PSW, which are carried out preferentially relative to the other detection results of the speed sensor 11, steering angle sensor 12 and accelerator opening sensor 14.

The thirteenth and fourteenth states are the state in which the operating states of the ABS is detected by the brake sensor 13, and in these states, irrespective of the aforesaid lateral G, vehicle speed and engine speed, or regardless of ON/OFF of the power switch 17, the S mode is selected. Thereby, since a loose coupling state is given preferentially between the front and rear wheels, the operation of the ABS is not hindered and a stable braking is realized.

The fifteenth state is the state wherein the ABS is not operating and the power switch 17 is turned on. In this state, irrespective of the lateral G, vehicle speed and engine speed, the P mode is selected and driving characteristics close to the directly coupled four-wheel driving state is obtained. That is, the driver may turn on the power switch 17 when necessary to realize the directly coupled four-wheel driving state forcibly.

Also in this case, however, since priority is given to switch-over to the S mode in connection with the braking operation, there is no possibility of hindering the ABS operation during the rapid braking, so that the stable braking is realized.

Inputs from the outside temperature sensor 15 and the wiper switch 16 to the opening control unit 10 are not used directly in selecting the mode as mentioned above, but in correcting the mode selected according to Table 2. That is, the opening control unit 10 is able to recognize that the wiper is used, or the raining state from the input from the wiper switch 16, and moreover, recognize the snowing state by the detected temperature by the outside air temperature (e.g. below ice point). In the case where such recognition is made, since a slip due to wet roads and fallen snow is anticipated, the opening control unit 10 changes partly the N mode selected in the first, second, fifth, ninth, tenth and twelfth states to the P mode which is one step higher. Thereby, deterioration of running stability in connection with the slip may be avoided effectively.

By controlling as described above, in the second embodiment of the fifth invention, transfer characteristics suitable for various running states are realized. At this time, the opening control unit 10 only functions simply to change the throttle opening in three steps, in response to combination of the detection results of the state quantities related to the running states, therefore there is no need of complicated configuration.

It is to be understood that state quantities related to the running states given to the opening control unit 10 are not limited by the vehicle speed, engine speed, lateral G and operating states of the ABS.

As particularly described above, in the fifth invention, a relatively simple configuration is realized for controlling the transfer characteristics of the hydraulic pump which is a transfer medium of the driving force in several steps, in response to combination of the detection results of a plurality of state quantities related to the running states. Thereby, since the transfer characteristics suitable for various running states can be obtained, in the four-wheel drive vehicle onto which the apparatus of the present invention is installed, there is little possibility of defective operation, thus it is very effective in improving the reliability and reducing the product cost.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A power transmission apparatus for vehicles which connects respective transmission shafts of front and rear wheels of a vehicle, comprising:

a hydraulic pump having a rotor and a casing which are respectively coupled and interlocked to said respective transmission shafts of said front and rear wheels and rotated relatively on the same axis, and connecting said rotor and said casing by hydraulic pressure which is generated responsive to a rotational speed difference between said rotor and said casing;

a throttle member which is able to rotate with interlocking with one of said rotor and casing, is disposed coaxially with said axis and movably along the same, and changes the hydraulic fluid discharge passage area of said hydraulic pump by moving along said axis;

a magnetic member having a common axis with said axis and coupled to said throttle member;

an exciting coil surrounding said magnetic member and supported nonrotatably; and moving means which moves said throttle member along said axis by movement of said magnetic member caused by exciting said coil.

2. A power transmission apparatus for vehicles as set forth in claim 1, wherein said throttle member and said magnetic member are disposed in a circular hole of a substantially cylindrical spacer which is interposed coaxially with said axis between said casing and one of said transmission shafts.

3. A power transmission apparatus for vehicles as set forth in claim 2, wherein said magnetic member and said throttle member are coupled in a unit.

4. A power transmission apparatus for vehicles as set forth in claim 2, wherein said spacer has a biasing member in said circular hole, and said throttle member is movable against said biasing member.

5. A power transmission apparatus for vehicles as set forth in claim 2, wherein said exciting coil is disposed on a supporting member restrained nonrotatably on a fixed portion so as to surround said outside of said magnetic member via a peripheral wall of said spacer.

6. A power transmission apparatus for vehicles as set forth in claim 2, further comprising:

a first annular groove formed around said throttle member and a second annular groove formed around said inner wall of said spacer corresponding to said first annular groove, and said first annular groove and said second annular grove forma a throttle portion which changes said hydraulic fluid discharge passage area, said first annular groove being opened in a space connected to a communicating hole whose one end is opened in said first annular groove, and whose other end is communicated with an oil tank of said hydraulic pump, and said second annular groove being opened in a hydraulic fluid discharge passage whose one end is opened in said second annular groove, and whose other end is opened in said casing via a hydraulic fluid communicating passage formed in said spacer.

7. A power transmission apparatus for vehicles as set forth in claim 2, wherein said spacer comprising:

a pair of coupling flanges respectively coupled coaxially to said casing and one of said transmission shafts, and a holding cylinder made of a non-magnetic member which is clamped and fixed between said pair of flanges by means of fixing bolts bridging between said pair of flanges, and interposed between said casing and one of said transmission shafts coaxially therewith, thereby holding said throttle member inside thereof slidably on said axis.

8. A power transmission apparatus for vehicles as set forth in claim 7, wherein said exciting coil is disposed on said inner wall of said supporting member, and said holding cylinder of said spacer is supported rotatably and coaxially on said supporting member via bearings provided on both sides of said exciting coil.

9. A power transmission apparatus for vehicles as set forth in claim 7, wherein said throttle member is a cylindrical member made of a magnetic member and disposed in a circular hole of said holding cylinder of said spacer.

10. A power transmission apparatus for vehicles as set forth in claim 1, further comprising;
   detecting means provided in a body of vehicle for detecting respectively plural state quantities relating to said running states; and
   an opening control unit which controls the energizing current to said exciting coil in response to said detection results of said respective detecting means.

11. A power transmission apparatus for vehicles as set forth in claim 10, wherein the opening of said throttle portion can be changed by movements of said magnetic member in connection with excitation of said exciting coil energized by a energizing instruction given from said opening control unit.

12. A power transmission apparatus for vehicles as set forth in claim 11, wherein said opening control unit changes the opening of said throttle portion stepwisely in response to combination of detection results of said detecting means.

13. A power transmission apparatus for vehicles as set forth in claim 12, wherein said biasing member has a plurality of springs which are arranged in parallel so as to change said biasing force stepwisely, and by said biasing force of said springs changed stepwisely, the opening of said throttle portion can be changed in plural steps.

14. A power transmission apparatus for vehicles as set forth in claim 12, wherein said biasing member has a plurality of springs which are arranged in series so as to change said biasing force stepwisely, and by said biasing force of said springs changed stepwisely, the opening of said throttle portion can be changed in plural steps.

15. A power transmission apparatus for vehicles as set forth in claim 12, wherein said exciting coil is provided with a plurality of coils which are possible to be energized separately so as to stepwisely change said magnetic force, and by said magnetic force generated by said exciting coil and changed stepwisely, the opening of said throttle portion can be changed in plural steps.

16. A power transmission apparatus for vehicles as set forth in claim 11, wherein said detecting means includes one of a vehicle speed sensor, a steering angle sensor, a brake sensor and an accelerator opening sensor.

17. A power transmission apparatus for vehicles as set forth in claim 11, wherein means for controlling said throttle portion forcibly at a predetermined opening with respect to said opening control unit is provided.

* * * * *